United States Patent
Kuckelkorn

(10) Patent No.: US 10,801,753 B2
(45) Date of Patent: Oct. 13, 2020

(54) METHOD AND DEVICE FOR INTRODUCING PROTECTIVE GAS INTO A RECEIVER TUBE

(71) Applicant: SCHOTT AG, Mainz (DE)

(72) Inventor: Thomas Kuckelkorn, Jena (DE)

(73) Assignee: SCHOTT AG, Mainz (DE)

( * ) Notice: Subject to any disclaimer, the term of this patent is extended or adjusted under 35 U.S.C. 154(b) by 356 days.

(21) Appl. No.: 15/456,625

(22) Filed: Mar. 13, 2017

(65) Prior Publication Data
US 2017/0184325 A1    Jun. 29, 2017

Related U.S. Application Data

(63) Continuation of application No. PCT/EP2015/069350, filed on Aug. 24, 2015.

(30) Foreign Application Priority Data

Sep. 12, 2014   (DE) .......................... 10 2014 218 333

(51) Int. Cl.
*F24S 10/40*    (2018.01)
*F24S 80/54*    (2018.01)
(Continued)

(52) U.S. Cl.
CPC ............ *F24S 10/45* (2018.05); *B23K 26/127* (2013.01); *B23K 26/206* (2013.01);
(Continued)

(58) Field of Classification Search
CPC . F24S 10/45; F24S 10/40; F24S 80/54; B23K 26/206; B23K 26/382;
(Continued)

(56) References Cited

U.S. PATENT DOCUMENTS 3,913,999 A * 10/1975 Clarke .................. B23K 26/12
219/121.71
4,183,351 A    1/1980 Hinotani
(Continued)

FOREIGN PATENT DOCUMENTS

CN    1061370    5/1992
CN    101893340    11/2010
(Continued)

OTHER PUBLICATIONS

Kuckelkorn DE 2011082772 English Translation (Year: 2013).*
(Continued)

*Primary Examiner* — Jason L Vaughan
*Assistant Examiner* — Amanda Kreiling
(74) *Attorney, Agent, or Firm* — Ohlandt, Greeley, Ruggiero & Perle, L.L.P.

(57) ABSTRACT

A method for introducing a protective gas into an annular space of a receiver tube, in particular for solar collectors, is provided where the annular space is formed at least by one outer cladding tube and an inner absorber tube of the receiver tube and the outer cladding tube is connected to the absorber tube by a wall. The method includes producing an opening that penetrates the cladding tube or the wall, introducing protective gas through the opening into the annular space, and subsequently closing the opening.

18 Claims, 21 Drawing Sheets

(51) Int. Cl.
- *B23K 26/382* (2014.01)
- *B23K 26/12* (2014.01)
- *B23K 26/20* (2014.01)
- *B23K 26/211* (2014.01)

(52) U.S. Cl.
CPC ........ *B23K 26/211* (2015.10); *B23K 26/382* (2015.10); *B23K 26/389* (2015.10); *F24S 10/40* (2018.05); *F24S 80/54* (2018.05); *Y02E 10/44* (2013.01)

(58) Field of Classification Search
CPC .. B23K 26/211; B23K 26/127; B23K 26/389; Y10T 29/49355
See application file for complete search history.

(56) References Cited

U.S. PATENT DOCUMENTS

| | | | | |
|---|---|---|---|---|
| 4,708,124 | A * | 11/1987 | Dorbeck | F24S 80/10 126/654 |
| 5,041,715 | A * | 8/1991 | Muller | B23K 26/12 219/121.64 |
| 5,192,846 | A * | 3/1993 | Duthoo | B23K 26/032 219/121.63 |
| 5,231,261 | A * | 7/1993 | Duthoo | B23K 26/032 219/121.63 |
| 6,598,601 | B2 * | 7/2003 | Schutz | F24S 10/45 126/655 |
| 2004/0050381 | A1 | 3/2004 | Kuckelkorn | |
| 2007/0235024 | A1 | 10/2007 | Kuckelkorn et al. | |
| 2012/0186576 | A1 | 7/2012 | Kuckelkorn et al. | |
| 2013/0228166 | A1 | 9/2013 | Kuckelkorn | |
| 2014/0345600 | A1 | 11/2014 | Mollenhoff | |

FOREIGN PATENT DOCUMENTS

| | | |
|---|---|---|
| DE | 2711889 | 9/1978 |
| DE | 19821137 | 11/1999 |
| DE | 102005057276 | 7/2007 |
| DE | 102009047548 | 6/2011 |
| DE | 102011082772 | 4/2013 |
| EP | 2581684 | 4/2013 |
| EP | 2756236 | 1/2016 |
| ES | 2375006 | 2/2012 |
| JP | S57128053 | 8/1982 |
| JP | S5862458 | 4/1983 |
| WO | 2004063640 | 7/2004 |
| WO | 2013037952 | 3/2013 |

OTHER PUBLICATIONS

English translation of International Search Report dated Nov. 17, 2015 for corresponding PCT/EP2015/069350, 3 pages.
English translation of Written Opinion of the International Searching Authority dated Nov. 17, 2015 for corresponding PCT/EP2015/069350, 9 pages.
English translation of International Preliminary Report on Patentability dated Mar. 14, 2017 for corresponding PCT/EP2015/069350, 10 pages.

\* cited by examiner

METHOD AND DEVICE FOR INTRODUCING PROTECTIVE GAS INTO A RECEIVER TUBE

CROSS REFERENCE TO RELATED APPLICATIONS

This application is a continuation of International Application No. PCT/EP2015/069350 filed Aug. 24, 2015, which claims the benefit of German Application No. 10 2014 218 333.2 filed Sep. 12, 2014, the entire contents of which are incorporated herein by reference.

BACKGROUND

1. Field of the Invention

The present invention relates to a method for introducing a protective gas into an annular space of a receiver tube, wherein the annular space is formed between an outer cladding tube and an inner absorber tube of the receiver tube and the outer cladding tube is connected to the absorber tube in a gastight manner by means of a wall. The wall is generally composed of metal and contains a glass-metal transition element, an expansion compensation element, as well as additional connecting elements. Furthermore, the invention relates to a device for introducing protective gas into the annular space of the receiver tube.

2. Description of Related Art

Solar collectors have a collector mirror—for example, a parabolic cylindrical mirror (parabolic trough)—and a receiver tube, and are utilized in solar thermal power plants preferably for the generation of electricity. The receiver tube is arranged in the focal line of each collector mirror and is generally composed of an absorber tube, which has a radiation-absorbing layer, and a cladding tube made of glass, which surrounds the absorber tube and thermally insulates it. In the known solar thermal power plants, a thermal oil, which is utilized as a heat-transfer medium, is carried through the absorber tube and can be heated to a temperature of about 400° C. by means of the solar radiation reflected from the collector mirrors and focused on the absorber tube. This heated oil is finally introduced into a vaporization process, by means of which the thermal energy stored in the thermal oil can be converted to electrical energy.

An annular space is formed in the receiver tube between the absorber tube and the cladding tube. This annular space serves to minimize heat losses at the outer surface of the absorber tube and thereby to increase the efficiency of the solar collector. For this purpose, the annular space is evacuated in order to obtain a thermal conductivity that is as low as possible.

However, on account of the high thermal load, the thermal oil utilized as heat-transfer medium in the absorber tube does not exhibit long-term stability and releases hydrogen with increasing aging. The quantity released during the aging process depends, on the one hand, on the thermal oil used and the operating conditions in the solar thermal power plants and, on the other hand, on the water content, which, in particular, can form with the oil during the vaporization process.

By permeation, the released hydrogen enters the evacuated annular space. In consequence, the pressure and the thermal conductivity of the annular space increase as well. This occurs until an equilibrium prevails between the partial pressures of hydrogen in the absorber tube and in the annular space. A particular drawback in this case is that hydrogen has a higher thermal conductivity than air, for example, so that, as the permeation of hydrogen progresses further, the thermal conductivity in the annular space is even better than that of the air outside of the receiver tube. In consequence, the efficiency of the receiver tube decreases and hence so does that of the complete solar collector.

In order to counteract this increase in the partial pressure of hydrogen in the annular space and thereby prolong the service life of the receiver tube, various solutions are known from the prior art.

For example, the hydrogen that has diffused into the annular space can be bound by means of getter materials. However, the absorption capacity of such materials is limited, so that, once the maximum absorption capacity of the getter materials has been attained, no further hydrogen can be bound and the pressure in the annular space increases once again.

Receiver tubes with a getter material arranged in the annular space are known from WO 2004/063640 A1, for example. In the device described in said specification, the getter material is arranged in getter bridges between the absorber tube and the cladding tube directly in the annular space. The getter bridges produce a spacing between the absorber tube and the getter, so that the thermal load on the getter is reduced and its long-term stability is thereby improved. However, apart from the use of a getter material, no other solution for diminishing the hydrogen concentration in the annular space has been provided, so that the drawbacks of the getter described above still remain.

In order to alleviate the problem of getter materials, DE 198 21 137 A1 discloses a receiver tube for solar thermal applications, in which, in addition, a noble gas with a partial pressure of up to several hundred mbar is present in the annular space. The advantage of this solution is that many noble gases have a lower thermal conductivity than hydrogen, so that the thermal conductance through the annular space and the deterioration in efficiency associated therewith can be reduced. However, the drawback of this design is that the annular space is filled with noble gas from the very start, so that, already directly after installation of the solar collector, an optimal efficiency of the receiver tube, as in the case of an evacuated annular space, is not achieved.

Alternative embodiments, such as, for example, those disclosed in DE 10 2005 057 276 B3, provide for at least one gastight sealed tank, filled with at least one noble gas, in the annular space, from which the noble gas is introduced into the annular space once the getter material is exhausted. The drawback of this alternative embodiment is that the solar collector and, in particular, the receiver tube must be already fabricated with a filled tank. Retrofitting is not possible, so that the customer needs to make a decision directly during fabrication of the receiver tube about whether to bear the extra costs and the increased work effort involved. Another problem is posed by the opening of the tank, which can be carried out only with increased effort.

A method for opening the tank and for filling the annular space with noble gas is known from DE 10 2011 082 772 B9, wherein the tank is opened by means of a laser drilling method. A laser beam is deflected from outside through the cladding tube onto the tank, which is irradiated until an opening forms in the tank and the protective gas is released. However, a drawback of this invention is also that retrofitting of the receiver tube with the protective gas tank is not possible and the customer needs to bear the increased costs and fabrication effort already during fabrication, even though the noble gas is only utilized a long time after startup.

A method for opening of holes in work pieces of a general kind by using focused laser pulses is described in the Unexamined Patent Specification DE 27 11 889 A1, for example.

Therefore, it is the object of the invention to provide a method and a device that make possible the filling of the annular space of a receiver tube with a protective gas and, in addition, the subsequent filling thereof.

SUMMARY

The method according to the invention for introducing a protective gas into an annular space of a receiver tube, in particular for solar collectors, wherein the annular space is formed between one outer cladding tube and an inner absorber tube of the receiver tube and the outer cladding tube is connected to the absorber tube by means of a wall, is characterized in that, in a first process step, an opening that penetrates the cladding tube or the wall is produced. Subsequently, protective gas is introduced through the opening into the annular space and, in a third process step, the opening is subsequently closed again.

The advantage of this method according to the invention is that the annular space of a receiver tube that has already been manufactured and even already installed in a solar collector can be filled subsequently with a protective gas and without great effort in terms of time or cost. Furthermore, the receiver tube can be supplied with an initially evacuated annular space, so that, at the very start of use, it is possible to realize a maximum efficiency. However, once the efficiency of the receiver tube reaches a critical value on account of hydrogen diffusion, the annular space can be filled with a protective gas in accordance with the method according to the invention, and thus it is possible to stop any further drop in efficiency.

The cost- and fabrication-intensive installation of an additional tank filled with protective gas is dispensed with. In addition, the annular spaces of already existing equipment can also be filled with noble gas at any time by means of the method according to the invention and hence a further reduction in efficiency can be stopped. In this way, the service life of all receiver tubes is increased, which offers a substantial economic and ecological advantage.

In the process, the critical value can be derived from the hydrogen concentration actually present in the annular space, which is measured by suitable sensors. A temperature measured at the glass cladding tube is also a suitable indicator, because, with increasing hydrogen concentration, the thermal conductivity of the annular space and thus also the temperature of the glass cladding tube increase during operation. Furthermore, the time or the efficiency of the solar collectors can also constitute the critical value.

In an advantageous embodiment of the method according to the invention, the opening is formed by means of a laser drilling method.

The laser drilling method has the advantage that, in principle, openings of any size and shape can be produced. To this end, it is merely necessary to adapt the power and/or geometry of the laser beam to the respective geometries and natures of the receiver tubes, cladding tubes, and/or walls. Furthermore, the laser drilling method equally offers the possibility of producing the opening either in the cladding tube, which is primarily composed of glass, or in the wall, which is primarily composed of metal or a metal alloy, by using the same device. In contrast to material-removing drilling processes, a laser drilling method makes it possible to produce openings without any abrasion, as a result of which contamination of the annular space is prevented.

In another advantageous embodiment, the opening is closed again by means of a laser welding method.

The closure by means of a laser welding method offers the advantage that the opening can be closed without additional application of a closing material. Furthermore, a laser beam can be adapted by variation of its power and/or geometry to the most diverse opening geometries and to different requirements, such as, for example, the wall thickness of the cladding tube or the wall or the material compositions thereof.

Another advantageous embodiment provides that the opening is produced under a pressure gradient from outside to inside into the annular space.

This embodiment provides that, outside of the cladding tube and consequently from the side facing away from the absorber tube, a higher pressure prevails than in the annular space. This elevated pressure can occur, for example, by imposing pressure by means of protective gas. This embodiment offers the advantage that protective gas already penetrates into the annular space once an opening is present and the filling process of the annular space is thereby shortened in time. In addition, any contamination of the annular space with foreign gases is also strongly restricted. The pressure gradient further leads to the possibility that very small openings, which can also be produced by means of a laser drilling method, remain open and fused material does not run once again into the opening and, as a result, a subsequent continuous filling process is made possible in spite of very small openings.

In a likewise advantageous embodiment, the opening is produced by means of a laser drilling method with a laser beam diameter $d_L 1$ and the opening can be closed, after the process chamber has been filled, by means of a laser welding method with a laser beam diameter $d_L 2$, where $d_L 2$ is greater than $d_L 1$. This embodiment offers the possibility of producing and again closing the opening by use of only one laser apparatus. When the opening is closed, it is merely necessary to widen the diameter of the laser beam by means of an optical system, for example. Afterwards, the opening is irradiated with a laser beam, the radius of which is greater than the opening radius. The result of this is that the material lying around the opening is heated by absorption and finally fused. These fused areas subsequently flow into the opening and close it.

In an alternative and further embodiment according to the invention, the closure of the opening occurs using an additional closing material.

Especially in the case of thin-walled cladding tubes or walls, it is possible that insufficient material is available for closure of the opening by fusion, so that the stability of the cladding tube or the wall is not ensured in the region of the closed opening. In such cases, in accordance with the invention, additional material is introduced onto or into the opening, as a result of which the opening is closed and also the surrounding material of the cladding tube or the wall is not impaired or is less impaired.

Another embodiment according to the invention provides that, prior to creation of the opening, the additional closure material is applied to the site of the tubular jacket or the wall that is to be opened.

The opening is produced all the way through the applied closure material. The closure material thereby has no significant influence on the opening step and filling process of the annular space. This embodiment also has the advantage that it is not necessary to use any direct material of the cladding tube or the wall for closure of the opening. Sufficient additional material is available, so that any impairment of the stability of the cladding tube or/and the wall is prevented.

Also advantageous is an embodiment in which the closure material is applied by a soldering, welding, or adhesive method.

By means of all these methods, the closure material is arranged in fixed position on the cladding tube or the wall, so that the danger of it shifting out of place during the opening step or filling process is diminished.

The additional closure material is fused after the annular space has been filled and subsequently runs at least partially into the opening so as to close it.

The fusion of the closure material can occur, as described above, by means of a laser beam, the diameter of which is greater than the opening diameter. In addition, it is possible to choose as a closure material a material with a melting temperature below that of the cladding tube or the wall, as a result of which, during fusion, markedly less energy is required and the local thermal load on the cladding tube or the wall is reduced further. Alternatively, the fusion can also occur by way of directly introduced thermal energy.

Alternatively to the applied closure material, it is provided in another advantageous embodiment that the closure material is pushed into or onto the opening only after filling of the annular space and hence the opening is closed at least partially.

Introducing the closure material only after filling of the annular space makes possible a smooth and undisturbed opening and filling process. Nonetheless, through the use of a closure material, there is sufficient additional material for the closure of the opening. The introduction of material into or onto the opening can be automated and/or it can occur under computer control, so that the opening can be closed in a specific and reliable manner.

In another embodiment according to the invention, the closure material is pushed into or onto the opening after filling of the annular space and fused at least partially by means of a laser, as a result of which the opening is closed.

This has the advantage that, owing to fusion of the separate closure material, the thermal load and potential damage to the cladding tube and/or wall entailed therewith can be prevented.

Another advantageous embodiment of the method according to the invention is characterized in that the opening is produced with at least two different diameters $d_O1$ and $d_O2$, where $d_O2$ represents the opening diameter at the side facing away from the absorber tube and $d_O1$ represents the opening diameter at the side of the cladding tube or wall facing the absorber tube, where the following holds: $d_O2>d_O1$.

Owing to the enlarged diameter at the outer side of the cladding tube, the introduction of an additional closure material into the opening is facilitated. In addition, this design of the opening in the form of a stepped drill hole makes possible a secure closure process. As a result of the fusion of a closure material in or at the opening diameter $d_O2$, the closure material runs both into the opening region with smaller diameter and also into the opening region with larger diameter. This leads to a minimization of potential cavities in the closure material inside of the opening and hence also to the minimization of potential admissions of gas.

In another advantageous embodiment, the opening in the wall is closed by means of resistance welding.

Owing to the fact that the wall is particularly composed of metal or a metal alloy, it conducts the current. Accordingly, through application of a voltage, closure of the opening is possible by means of resistance welding. The great advantage of this welding technique consists in the possibility of concentrating a high energy in the form of electric current onto a small area of a work piece within a very short time, whereby, under supply of high pressure (pneumatic or electromechanical), an irreversible connection is produced. As a result, the opening that is produced can be closed in a fast and firm manner.

This advantageous embodiment can also occur by using an additional closure material.

Another embodiment is characterized in that the closure of the opening occurs by using at least one rod electrode.

Through the use of at least one rod electrode, it is possible to restrict the effect of resistance welding to the opening in a highly specific and local manner. Accordingly, surrounding areas of the wall are not influenced. Furthermore, it is possible through the choice of suitable geometries of the rod electrodes to enable the resistance welding of different embodiments of the wall as well. In addition, the rod electrode enables an adequate pressure to be applied locally in the region of the opening, as a result of which closure is simplified and also promoted.

Another and likewise advantageous embodiment provides that, after filling of the annular space, the closure material is pushed at least partially into or onto the opening, at least one electrode is contacted in each instance with the closure material and with the wall, the closure material is fused by means of resistance welding, and hence the opening is closed.

In this embodiment, all of the aforementioned advantages of resistance welding and the use of a closure material are combined.

In another embodiment, the opening is produced mechanically. Mechanical opening can occur by using a mandrel, for example. In the process the mandrel is pressed through the wall and then pulled back out, as a result of which a corresponding opening is produced through the wall.

In an advantageous embodiment, however, the opening is produced through the use of a cannula, with the cannula being pressed through the wall.

The use of a cannula has the advantage that a direct access to the annular space through the cavity of the cannula is formed, so that the cannula does not need to be pulled back out once again from the opening. After puncturing with the cannula has occurred, a segment of the cannula is located in the annular space, while another segment protrudes from the wall and enables intakes for the introduction of a protective gas to be easily attached. In this case, the cannula acts like a cannula of a syringe and simplifies the subsequent filling process. Furthermore, the use of a cannula also benefits the later closure of the opening.

Thus, another embodiment according to the invention provides that the cannula is pressed through the wall, the annular space is filled via the cannula, and the opening is subsequently closed by closure of the cannula.

The advantage of this embodiment lies in the fact that the wall is pierced only one time by means of the cannula and all further method steps occur via this cannula. When the annular space is opened and closed, the thermal load on the wall is thus reduced. Furthermore, the closure of the opening occurs indirectly by closing the cannula. In the process, the cannula is substantially more readily accessible and easier to close, so that, here, too, there is a simplification and thus entailed time savings during the closure.

Advantageously, the cannula is closed by at least one of the following methods: resistance welding, friction welding, or induction soldering.

This method, by means of which a closure of the cannula can occur rapidly and reliably, has been long tried and tested. In order to make possible resistance welding, the cannula is composed at least partially of metal or an alloy.

Another advantageous embodiment of the method according to the invention is characterized in that, prior to the creation of the opening, an evacuated process chamber is arranged at the cladding tube and/or the wall at the place to be opened in an enclosing and gastight manner, then evacuated and filled with protective gas.

Accordingly, the introduction of a protective gas into an annular space of a receiver tube takes place from this process chamber. The advantage of this process chamber consists in the fact that the method can be carried out in a manner that is protected against all environmental influences, such as, for example, pressure or humidity, but also against mechanical loads or foreign particles. Any contamination of the process chamber is thereby prevented. It is possible in the process chamber to adjust any environmental parameters, as a result of which the method can be carried out flexibly and independent of climatic influences. Furthermore, the process chamber makes it possible for all method means required for the method to be arranged already beforehand inside of the process chamber, so that the process chamber need not be opened during the method.

In a likewise advantageous embodiment, after creation of the opening, it is waited until the desired gas exchange has occurred between the annular space and the process chamber.

On account of this limited opening diameter, it is necessary, once the protective gas has been introduced into the process chamber, to wait for a certain time until the protective gas has become distributed inside of the annular space with the intended partial pressure. This waiting time depends on the opening diameter, the protective gas, and the difference in pressure between the annular space and the protective gas reservoir. The filling process can be monitored directly by means of pressure measurements or by means of time measurements, when the pressure relations and the opening diameter are known.

Subsequent to the gas exchange, the opening is closed and the process chamber is then ventilated and once again separated from the receiver tube.

Accordingly, the process chamber can be attached reversibly to the receiver tube and reused several times and for various receiver tubes.

Alternatively, however, the process chamber can also be connected irreversibly to the wall and/or to the cladding tube, so that, subsequent to the gas exchange, the opening is closed and, even though the process chamber is ventilated, it is not separated once again from the receiver tube.

Besides relating to a method, the invention also relates to a device for introducing a protective gas into the annular space of a receiver tube, said device being referred to hereinafter as a "filling device," in particular for solar collectors, in which the annular space is formed between an outer cladding tube and an inner absorber tube of the receiver tube and the outer cladding tube is connected to the absorber tube in a gastight manner by means of a wall and the device includes a process chamber, means for producing an opening through the cladding tube or the wall, means for introducing protective gas into the annular space, and means for closing the opening.

This device offers the advantages discussed above in connection with the method according to the invention.

In an advantageous embodiment, the means for producing an opening through the cladding tube or the wall are constituted by a laser system. This laser system offers the possibility of producing openings through the tubular jacket or the wall with diverse diameters and geometries rapidly and without material removal. Detailed advantages of a laser system have already been explained in connection with the description of the method according to the invention.

In a likewise advantageous embodiment, the means for producing an opening through the wall are constituted by a punching system with a cannula arranged at this punching system.

Furthermore, the means for introducing protective gas into the annular space are constituted advantageously by a gas supply system. This supply system makes possible a rapid and cost-effective filling process of the annular space. In this case, the gas supply system has a gas tank, which is arranged in an exchangeable manner in the gas supply system. Thus, a rapid exchange of the process gas or replacement of an empty gas tank is made possible.

Another advantageous embodiment of the device is characterized in that the means for closing the opening are constituted by a laser system or a laser system with closure material or a heating system, such as, for example, an induction coil or a heating coil with closure material.

Reference is made, in turn, to the descriptions of advantages in connection with the method according to the invention for the respective advantages of the individual components of the device.

Likewise advantageous is an embodiment in which the process chamber has an outlet opening for evacuating the process chamber, a lead-through opening for the means for producing the opening through the cladding tube or the wall, and an inlet opening for filling the process chamber with protective gas. It is possible by way of these openings to achieve a fast and cost-effective operation of the device and an efficient implementation of the method.

In another advantageous embodiment, the process chamber can be connected via the outlet opening to a vacuum system, via the inlet opening to a gas supply system, and via the lead-through opening to a laser system or a punching system.

In order to ensure a rapid fastening of the process chamber at the receiver tube and, in particular, at the wall, means for reversible fastening of the process chamber at the receiver tube and, in particular, at the wall are arranged at the process chamber.

In another embodiment, in addition to the process chamber, a support system, which is connected to the process chamber through a vacuum-tight corrugated hose connection, is provided. This arrangement has the advantage that all mechanically acting forces of the laser, the pump, etc., which are connected to the support system, are absorbed by the support system and hence the sealing at the wall is not subjected to a mechanical load. In addition, the corrugated hose connection can be attached for receiving the laser, so as to achieve a complete encapsulation of the laser beam path.

The process chamber is equipped with a vacuum-tight window that is transparent for the laser beam. In addition, a protective glass can be attached in the process chamber, said protective glass being preferably rotatable and protecting the laser window against vapor deposition during the opening process. The support system has a further camera system with connecting ports for the pumping and gas supply system, including all required sensors as well as a mount and calibrating apparatus for the laser head. Instead of a gas line, it is also possible to use preferably a prefilled gas cartridge, which is exchanged prior to each new filling process. Preferably, there is also a connecting port at the camera system for receiving a vacuum getter, which ensures the maintenance of the gas purity during the filling process. Alternatively, the getter can also be introduced into the noble gas cartridge prior to the filling process and then activated after closure.

In another preferred embodiment, it is possible to use a vaporized barium getter in a glass tube, said vaporized barium getter being used at the same time as an indicator for the quality of the filling operation. It is possible by use of a getter to dismantle the pumping system under noble gas atmosphere prior to opening of the receiver and the opening process can be carried out after flooding of the chamber with noble gas. In this way, interfering vibrations due to the pumping system can be prevented and the process safety can be improved. Moreover, it is thereby possible prior to opening to ensure that the camera system is still gastight after the flooding.

BRIEF DESCRIPTION OF THE FIGURES

Further features, advantages, and exemplary embodiments of the method and the device for introducing a protective gas into an annular space are discussed below on the basis of the description of figures. Shown are.

DETAILED DESCRIPTION

Figure 1A:
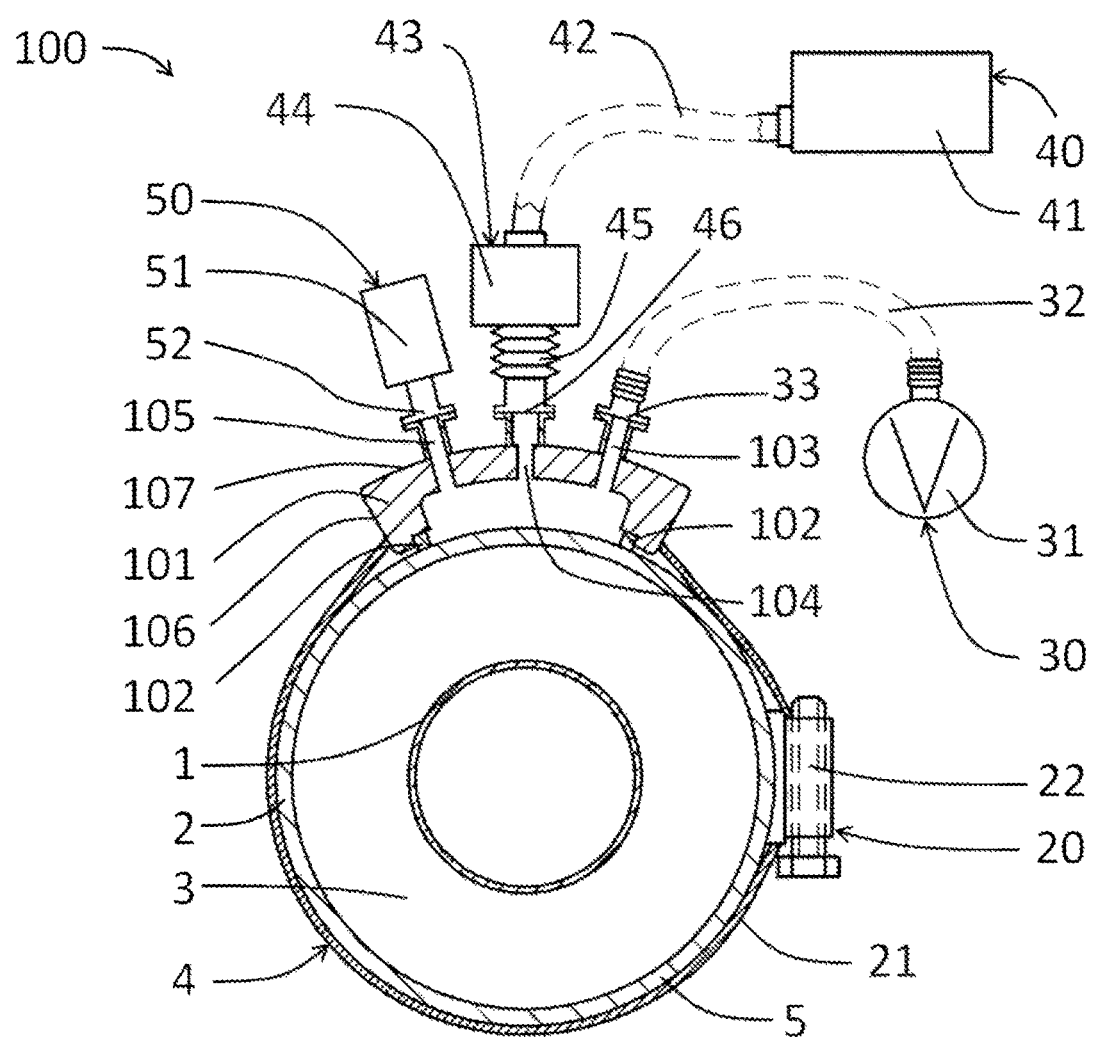
FIG. 1a a first embodiment of the filling device.

A first embodiment of the filling device 100 according to the invention is illustrated in FIG. 1a. This device 100 has a process chamber 101, which can be fixed in place at a receiver tube 4 by way of a fastening system 20, which is composed of a clamp 21 and a fastener 22. The receiver tube 4 is characterized by an absorber tube 1 and a cladding tube 2, with an annular space 3 being formed between the absorber tube 1 and the cladding tube 2. The filling device 100 is fastened at the cladding tube 2 or preferably at the wall 5 by means of the clamp 21. The wall 5 contains an expansion compensation piece, which is not illustrated in FIG. 1 and was already discussed in the introductory section. Further elaborating details in regard to the wall 5 are discussed in connection with FIG. 5b. Alternatively, the filling device 100 can also be placed directly on the glass of the cladding tube 2. Preferably, the fastening system 20 is arranged partially at a side wall 106 of the process chamber 101, thereby producing a homogeneous compressive pressure on the wall 5 or on the cladding tube 2.

In order to be able to attach the process chamber 101 rapidly and reversibly to various receiver tubes 4 with different diameters of the cladding tube 2 or the wall 5, the circumferential size of the clamp 21 can be adjusted variably by means of the fastener 22. By way of example, commercially available worm clamps are suitable as a fastening system 20. Alternatively to a clamp 21, however, it is also possible to use a rubber band or strap for fixing in place the process chamber 101 on the receiver tube 4.

In order to seal off the interior of the process chamber 101 from external environmental influences, seals 102 are attached at contact sites between the process chamber 101 and the receiver tube 4. These seals 102 can be designed, for example, as a sealing ring 102. It is possible by means of the fastening system 20 and the seal 102 to fasten the interior of the process chamber 101 on the receiver tube 4 in a reversible manner.

In order to be able to evacuate the process chamber 101, said process chamber has an outlet opening 103 and is connected to a vacuum system 30 by means of a flange connection 33. This vacuum system 30 includes a vacuum pump 31 and vacuum hoses 32, with at least one vacuum hose 32 connecting the vacuum pump 31 to the process chamber 101 via the flange connection 33. Accordingly, the process chamber 101 can be evacuated via the outlet opening 23a and pressures of several mbar can be obtained within the process chamber 101.

Furthermore, the process chamber 101 disposes over a lead-through opening 104. In a first embodiment of the filling device 100, this opening 104 connects the process chamber 101 to the laser system 40. In this case, the laser system 40 has a laser source 41 in the form of a laser diode or a solid-state laser, for example. This laser source 41 is connected to a laser head 43 via at least one light guide 42, with the laser head 43, together with a flange connection 46, constituting the connecting site between the laser system 40 and the process chamber 101. In order to be able to adapt the laser beam emitted from the laser source 41 to the respective characteristics of the cladding tube 2 or the wall 5, such as, for example, the material composition or wall thickness thereof, the laser head 43 has an optical system 44 for adjusting the beam width of the laser beam and a focusing unit 45 for controlling the focal point of the laser beam in the radial direction of the receiver tube 4. Via the laser head 43, the laser beam enters the interior of the process chamber 101 through the lead-through opening 104 and, with its focal point, finally reaches the surface of the cladding tube 2 or the wall 5 of the receiver tube 4.

In order to be able to fill the process chamber 101 with a gas and, in particular, with an inert process gas—for example, a noble gas—said process chamber is connected via an inlet opening 105 to a gas supply system 50. The gas supply system 50 has a gas tank 51, which is filled with the process gas and is connected to the process chamber 101 by means of a flange connection 52. In order to be able to control the proportion of process gas inside of the process chamber 101, a valve, for example, which is not illustrated in FIG. 1a, is arranged between the flange connection 52 and the gas tank 51. Alternatively, the flow rate of the process gas into the process chamber 101 can be analyzed and controlled by means of a gas flow meter, which is also arranged between the flange connection 52 and the gas tank 51 and is not illustrated in FIG. 1a.

The inlet opening 105, the lead-through opening 104, and the outlet opening 103 are each arranged on the side of the process chamber 101, namely, the cover wall 107, that faces away from the receiver tube 4.

The various process steps for filling the annular space 3 of the receiver tube 4 will be discussed on the basis of FIGS. 1a to 1c by means of a first embodiment of the filling device 100.

As can be seen in FIG. 1a, in a first step, the filling device 100, composed of the process chamber 101, the vacuum system 30, the laser system 40, and the gas supply system 50, is arranged at a receiver tube 4 and, in particular, at the wall 5 or cladding tube 2 thereof by means of a fastening system 20. In the process, the seal 102 forms preferably the sole contact between the process chamber 101 and the wall 5 or the cladding tube 2. Subsequently, the fastening system 20 is tightened, so that the process chamber 101 is pressed against the glass-metal transition element 5. If the fastening system 20 is formed by a clamp 21, for example, the tightening occurs by adjustment of the fastener 22.

Once the process chamber 101 has been placed on the cladding tube 2 or the wall 5 in a gastight manner, the interior thereof is evacuated via the outlet opening 103 by means of the vacuum pump 31 of the vacuum system 30. This occurs until pressures of approximately $10^{-3}$ to $10^{-2}$ mbar prevail in the process chamber. As a result of this evacuation, the interior of the process chamber 101 is freed of foreign material, which could otherwise lead to a contamination of the annular space 3 when the cladding tube 2 or the wall 5 is later opened.

Optionally, after evacuation of the process chamber 101 and prior to opening of the cladding tube 2 or the wall 5, the interior of the process chamber 101 can be filled already with a process gas from the gas tank 51 of the gas supply system 50 via the inlet opening 105. Such an application of pressure acts advantageously on the subsequent opening of the wall 5 or the cladding tube 2 in that the pressure prevents material from running into the holes. In addition, a prior filling of the process chamber 101 reduces the subsequent filling time of the annular space 3.

Figure 1B:
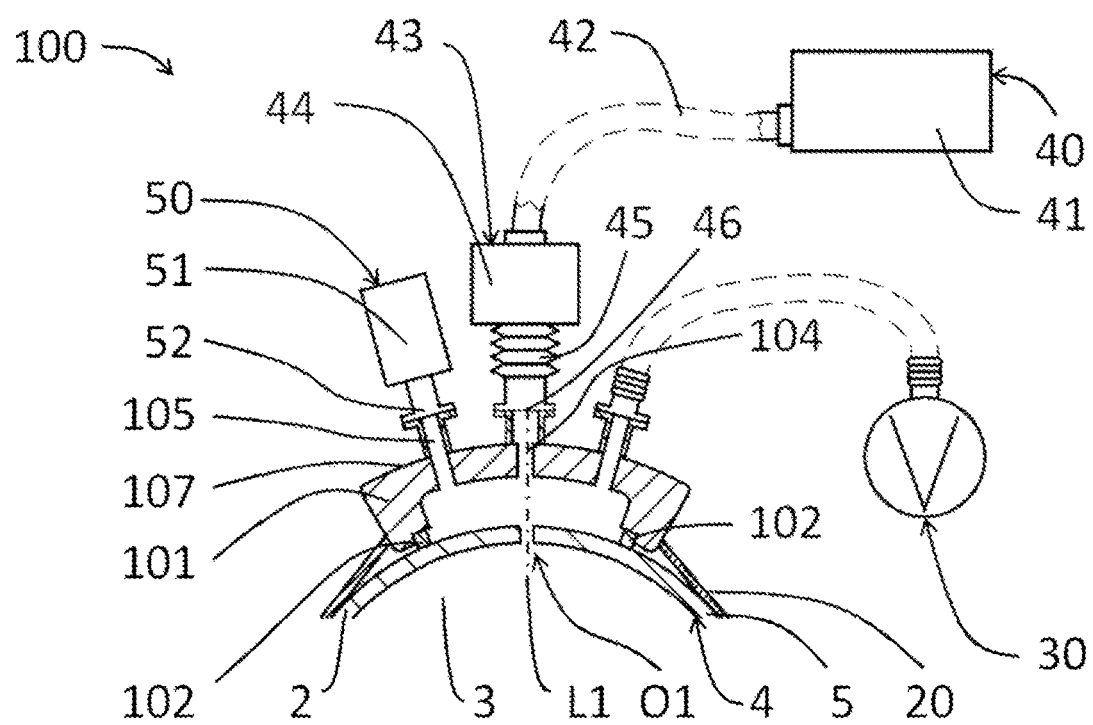
FIGS. 1b-1c the filling device during various process steps for filling an annular space, FIG. 2a a second embodiment of the filling device, FIGS. 2b-2d the filling device of the second embodiment during various process steps for filling an annular space, FIG. 3a a third embodiment of the filling device, FIGS. 3b-3e the filling device of the third embodiment during various process steps for filling of an annular space, FIG. 4a a fourth embodiment of the filling device, FIGS. 4b-4e the filling device of the fourth embodiment during various process steps for filling of an annular space, FIG. 5a fifth embodiment of the filling device, FIG. 5b an enlarged illustration of the process chamber according to the fifth embodiment, FIG. 6a a sixth embodiment of the filling device, and FIG. 6b an enlarged illustration of the process chamber according to the sixth embodiment.

Once the process chamber 101 has been evacuated and optionally already filled with a process gas, an opening O1 is produced through the wall 5 or directly through the cladding tube 2 by means of the laser system 40, this being illustrated in FIG. 1b.

In the laser source 41, a laser beam is produced by laser diodes, for example, and directed via the light guide 42 into the laser head 43. In this laser head 43, the beam width of the laser beam is adjusted by means of the optical system 44. It is also possible via the focusing unit 45 to adjust and alter the focal point of the laser beam along the axis L1.

Accordingly, the laser beam produced in the laser source 41 is directed via the laser head and the lead-through opening 104 along the axis L1 into the process chamber 101 and onto the surface of the cladding tube 2 or the wall 5. Owing to the high energy of the laser beam, vaporization processes occur at the contact point of the laser beam and the cladding tube 2 or the wall 5, so that material is removed. This occurs until a complete opening O1 has been produced through the cladding tube 2 or the wall 5. As a result, the interior of the process chamber 101 and the interior of the annular space 3 are connected spatially to each other and the process gas can flow out of the gas tank 51 of the gas supply system 50 via the inlet opening 105 into the interior of the process chamber 101 and via the opening O1 into the annular space 3.

This occurs until the desired quantity of process gas has flowed into the annular space 3. As characteristic parameters, it is possible in this case to measure, for example, the pressure inside of the process chamber 101, the quantity of process gas flowing through the inlet opening 105, or else the process time.

Figure 1C:
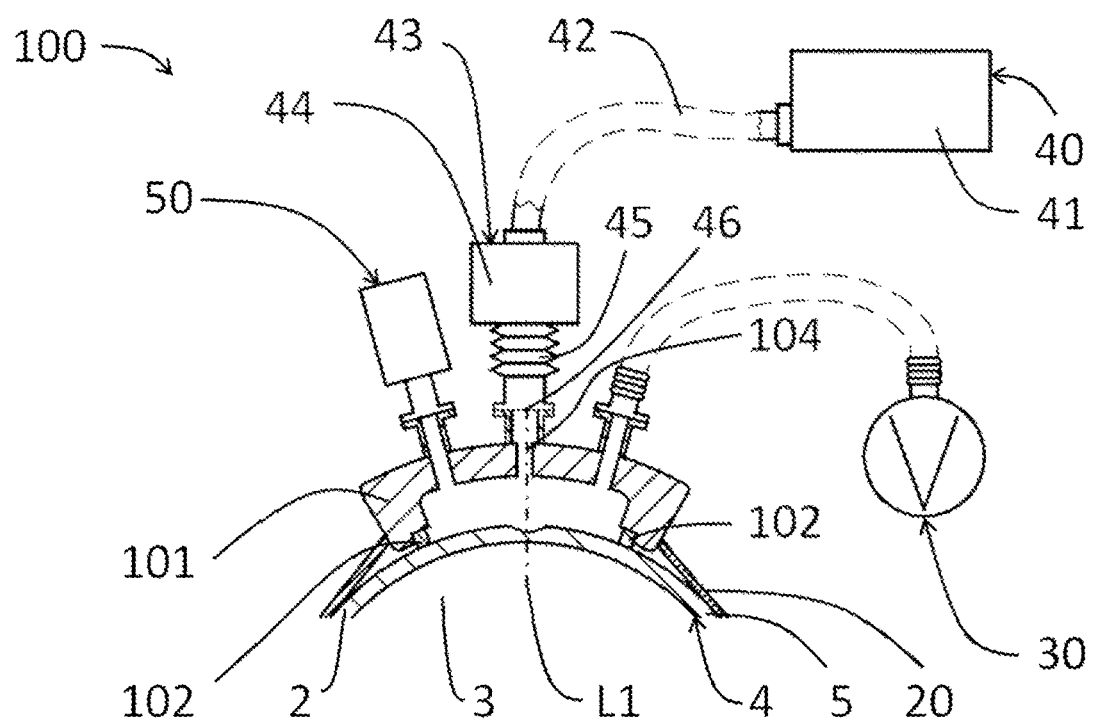

Subsequent to this filling process, the opening O1 is again closed, which is depicted in FIG. 1c. For this purpose, the laser beam is widened in the focus thereof by the optical system 44. Thus, the laser beam in the focal point has a larger diameter than the opening O1 and no longer has the energy density of the material of the cladding tube 2 or the wall 5 required for vaporization, but rather only fuses this material. For closure of the opening O1, the widened laser beam is radiated along the axis L1 onto the opening O1. As a result of this, the edges of the opening O1 soften and finally fuse. The fused material then flows into the opening O1 and closes it and, consequently, the annular space 3 and the process chamber 101 are once again separated spatially from each other. Accordingly, no additional closure material for the closure of the opening O1 is necessary.

In a last step, the fastening system 20 is released, as a result of which the filling device 100 can be removed completely from the receiver tube 4.

Figure 2A:
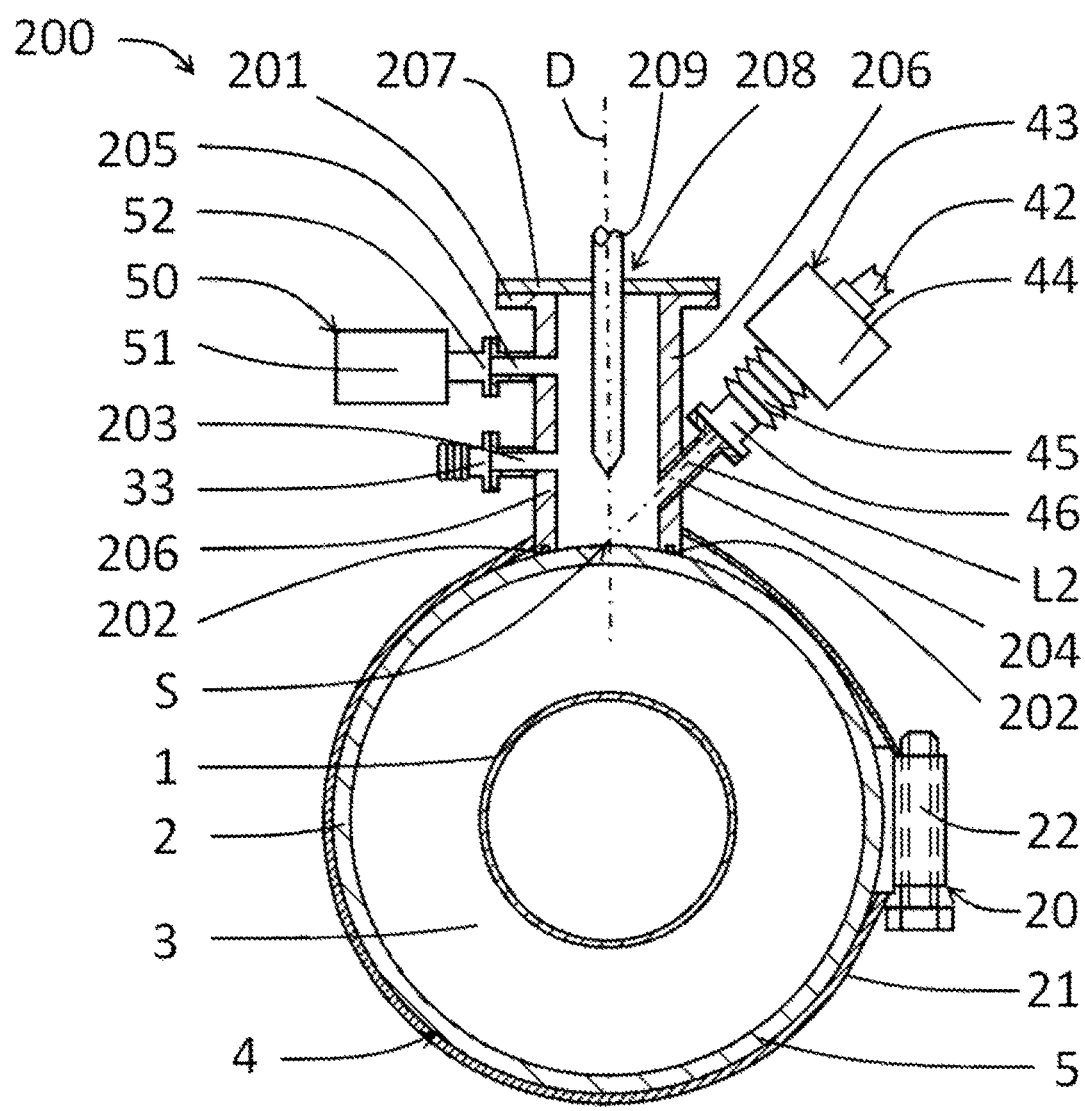

Illustrated in FIG. 2a is a second embodiment of the filling device 200, wherein, in analogy to the device 100 from FIG. 1a, the process chamber 201 is fastened reversibly to the receiver tube 4 by means of a fastening system 20. In this embodiment, too, the clamping force of the fastening system 20 and, in particular, the clamp 21 can be regulated by means of the fastener 22, so that the compressive force of the process chamber 201 can be adjusted variably.

In order to be able to seal off the interior of the process chamber 201 against external environmental influences, at least one seal 202 in the form of a sealing ring, for example, is also attached at the contact regions between the process chamber 201 and the receiver tube 4, with the seal 202 in this embodiment as well preferably representing the sole contact between the process chamber 201 and the receiver tube 4. By means of the fastening system 20 and the seal 21, the interior of the process chamber 201 is fastened reversibly on the receiver tube 4.

As in the case of the first embodiment, the process chamber 201 also has an outlet opening 203, a lead-through opening 204, and an inlet opening 205. In this case, the outlet opening 203 connects the interior of the process chamber 201 via the flange connection 33 to the vacuum system, which is not illustrated in FIG. 2a, so that the process chamber 201 can be evacuated through the outlet opening 203. The inlet opening 205, in turn, connects the interior of the process chamber 201 to the gas supply system 50 by means of the flange connection 52. In this case, the gas supply system 50 also has a gas tank 51, which is filled with a process gas. Furthermore, the lead-through opening 204 connects the process chamber 201 via the flange connection 46 to the laser head 43 of the laser system, which is not shown in full in FIG. 2a.

Further properties and features of the vacuum system, the laser system, and the gas supply system 50 are analogous to the filling device 100 illustrated in FIG. 1a, with the exception of the positioning of the outlet opening 203, of the lead-through opening 204, and of the inlet opening 205. In contrast to the filling device 100 illustrated in FIG. 1a, the openings 203, 204, 205 in the second embodiment 200 are not integrated in the cover wall 207, but rather in the side wall 206 of the process chamber 201. In this case, the outlet opening 203 and the inlet opening 205 are arranged opposite-lying to the lead-through opening 204. However, the lead-through opening 204 does not extend perpendicularly through the side wall 206, but rather it is arranged at an angle in such a way that the laser beam passing through the opening 204 impinges inside of the process chamber 201 on the surface of the cladding tube 2 or the wall 5 of the receiver tube 4. As a result of this arrangement of the lead-through opening 204 and the laser system connected to the lead-through opening 204, an opening O2 can be produced through the cladding tube 2 or the wall 5 by means of the laser beam, this opening O2 being illustrated in FIG. 2b.

In order to be able to close again the opening O2 after gas exchange, a closure material 209 in the form of a welding wire is additionally arranged inside of the process chamber 201. This welding wire 209 extends through the gastight lead-through opening 208 through the cover wall 207 along an axis D into the process chamber 201. If the process chamber 201 is arranged on the receiver tube 4, then the closure material 209 extends inside of the process chamber 201 preferably radially with respect to the receiver tube 4 from the cover wall 207 in the direction of the cladding tube 2 or the wall 5. In this case, the closure material 209 is arranged along the axis D, which is preferably directed perpendicularly through the cover wall 207, so as to be able to move in the direction of the axis D. Furthermore, the closure material 209, the lead-through opening 204, and the laser head 43 are arranged in such a way that the beam axis L2 of the laser beam and the axis D of the closure material 209 meet at a point of intersection S on the surface of the cladding tube 2 or the wall 5 for the process chamber 201 mounted on the receiver 4. This point of intersection S is located inside of the process chamber 201.

In order to be able to seal the process chamber 201 reliably against external environmental influences, the lead-through opening 208 is preferably designed as a vacuum lead-through opening.

Alternatively to the fastening of the embodiments of the filling device 100, 200, discussed in FIGS. 1a and 2a, by means of the clamp 21, the process chambers 101, 201 can also be directly connected reversibly to the receiver tube 4 and this will be discussed in detail in connection with FIGS. 3a and 3b.

In FIGS. 2a to 2d, the various process steps for filling the annular space 3 of the receiver tube 4 by means of the second embodiment of the filling device 200 are discussed.

First of all, the process chamber 201 is arranged at the receiver tube 4 and, in particular, at the cladding tube 2 thereof or the wall 5 thereof by means of the fastening system 20, with the seals 202 preferably forming the sole contact between the process chamber 201 and the cladding tube 2 or the wall 5.

Once the process chamber 201 has been placed on the cladding tube 2 or the wall 5 in a gastight manner, the interior thereof is evacuated via the outlet opening 203 by means of the vacuum system. Optionally, after evacuation of the process chamber 201 and prior to opening of the cladding tube 2 or the wall 5, the interior of the process chamber 201 can be filled with a process gas via the inlet opening 205.

For detailed information on these process steps, reference is made at this point to the description of FIG. 1b, because these steps are identical in the first and second embodiment of the filling device 100, 200.

Figure 2B:
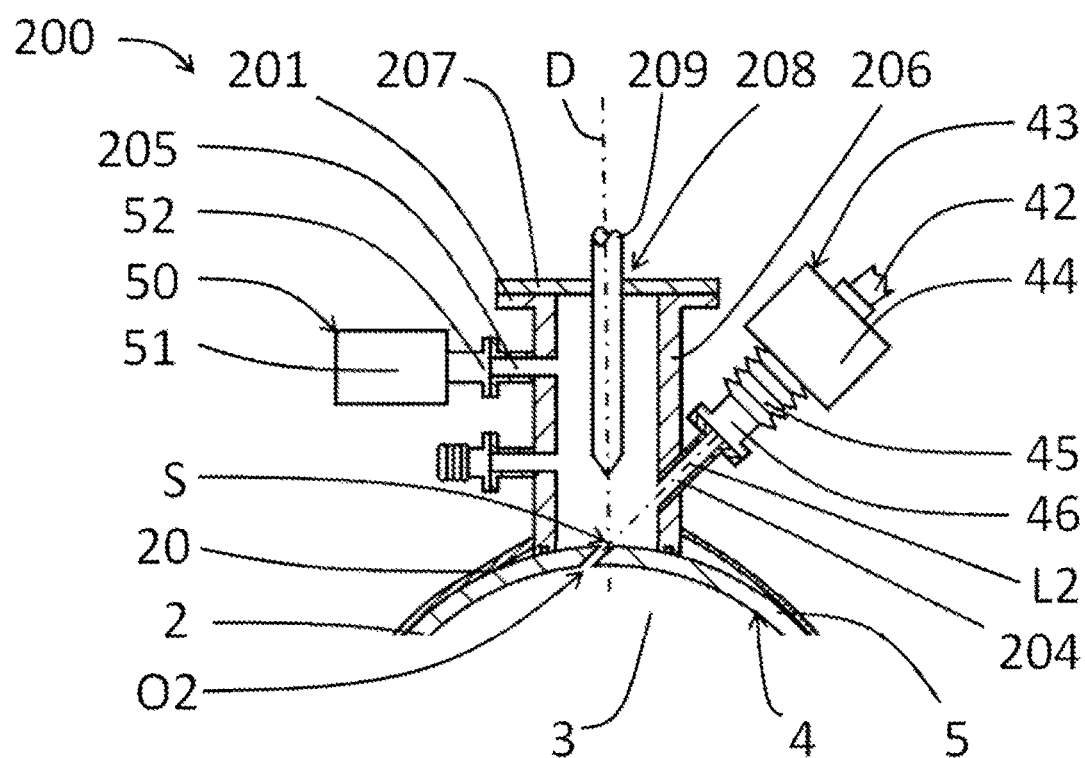

Once the process chamber 201 has been evacuated and optionally filled with a process gas, an opening O2 is produced through the cladding tube 2 or the wall 5 by means of the laser system, this being illustrated in FIG. 2b. The creation of the opening O2 occurs in analogy to that of the opening O1 of the first embodiment form 100. However, the opening O2 does not extend radially through the cladding tube 2 or the wall 5, but rather at an angle, with the central axis of the opening O2 and the axis D intersecting in the interior of the process chamber 201 at the point S. Once the opening O2 has been produced, the annular space 3 is once again spatially connected to the process chamber 201, so that a filling of the annular space 3 with process gas can occur. This filling also occurs identically to the filling of the annular space 3 by use of the first embodiment of the filling device 100.

Figure 2C:
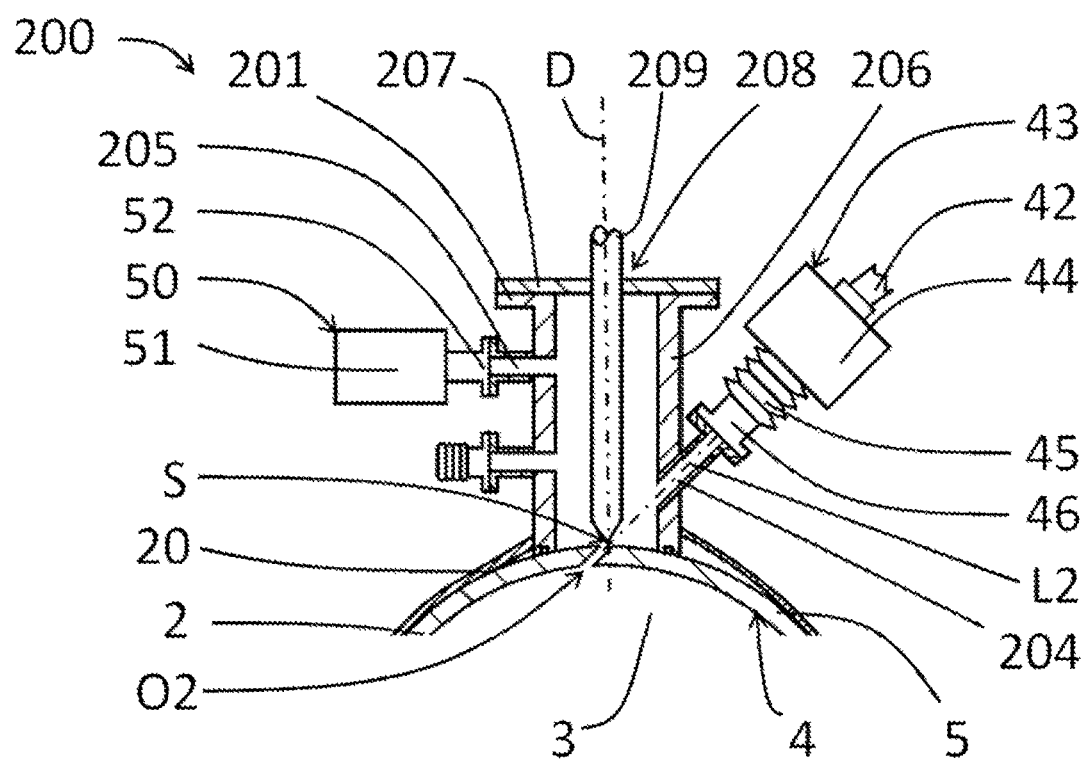

In order to be able to close again the opening O2, the closure material 209 is caused to travel along the axis D in the direction of the receiver tube 4 by using a stroke apparatus that is not illustrated in FIG. 2c. This occurs until the closure material 209 at least contacts the axis L2 of the laser beam. Preferably, however, the closure material extends to the cladding tube 2 or the wall 5. Once the closure material 209 has reached this position, the laser beam melts the material 209 at the intersection point S. Subsequently, the melted closure material 209 flows at least partially into the opening O2, in which it subsequently resolidifies. As a result of this, the opening O2 is closed and the annular space 3 is separated spatially from the process chamber 201. For fusing of the material 209, the laser beam preferably has a smaller energy density in comparison to the creation of the opening O2. This is achieved, for example, by an enlargement of the focal diameter or by beam energy reduction.

Figure 2D:
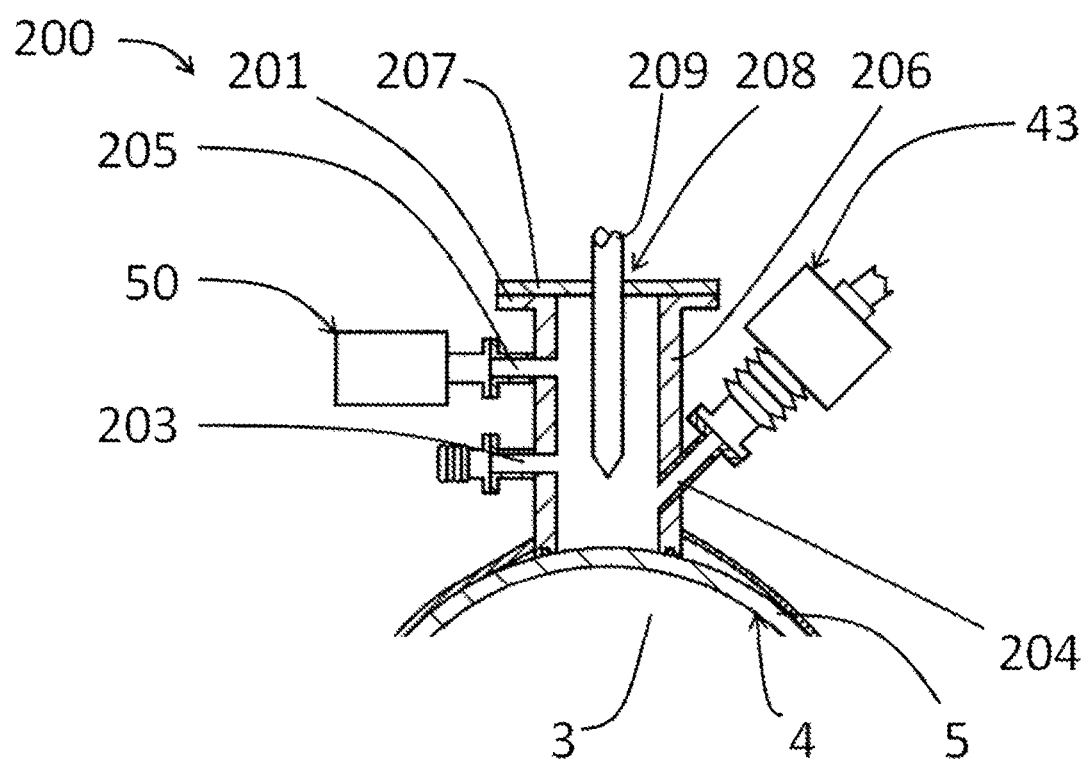

Subsequently, as illustrated in FIG. 2d, the closure material 209 is once again moved in its initial position away from the receiver tube 4 along the axis D and the filling device 200 can be lifted from the receiver tube 4 by releasing the fastening device 20.

Figure 3A:
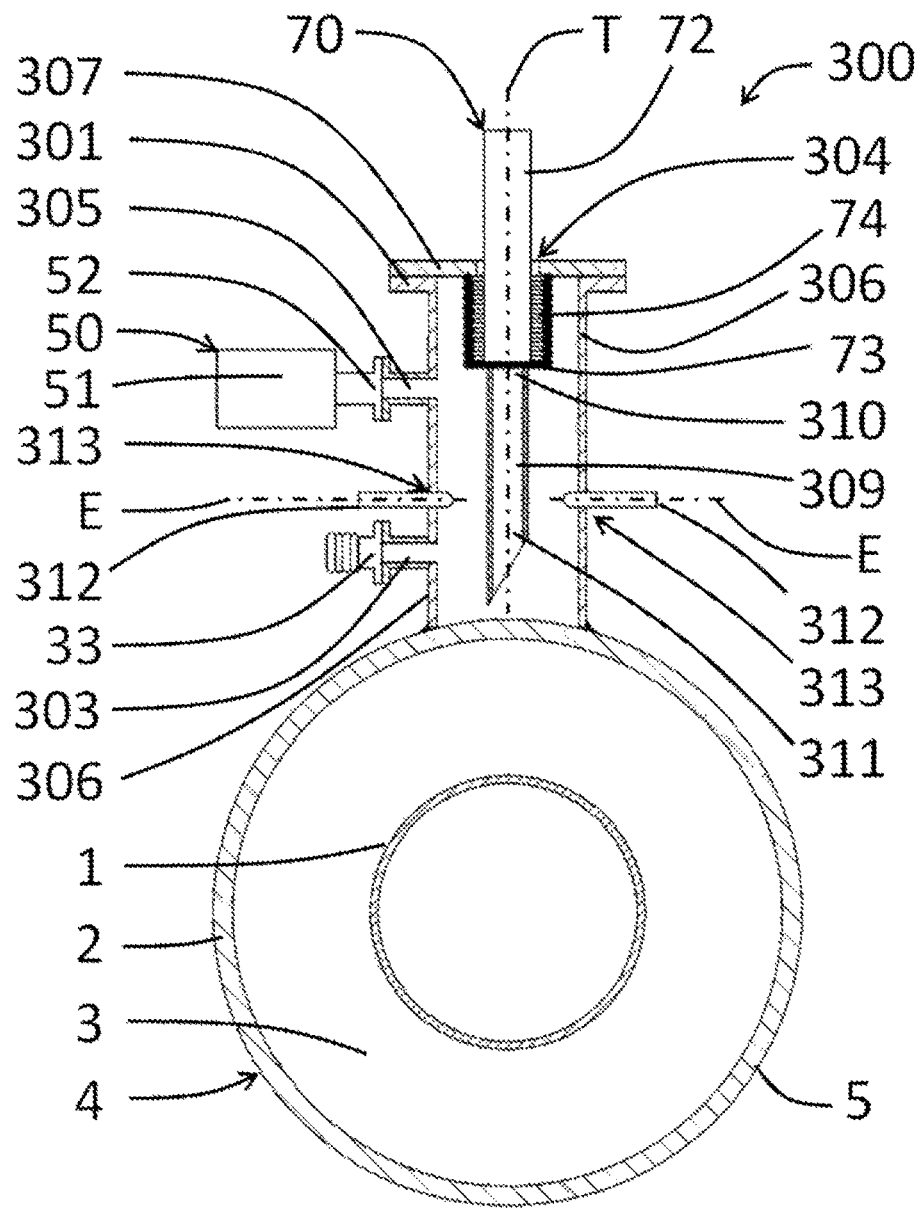

In order to protect the fragile cladding tube 2 and the wall 5 from loads that are too strong owing to a fastening system 20 and thereby to protect them from potentially occurring damage, a third embodiment of the filling device 300, illustrated in FIG. 3a, can be attached to the receiver tube 4 and, in particular, to the wall 5 without additional fastening devices. For this purpose, the process chamber 301 is connected directly to the cladding tube 2 and, in particular, to the wall 5 at the contact sites between the side wall 306 and the cladding tube 2 or the wall 5. As a result of this connection, the interior of the process chamber 301 is closed off in a gastight manner against external environmental influences. If the wall 5 and the process chamber 301 are each composed of electrically conductive material, then the connection can occur, for example, by means of the resistance welding. Alternatively, the connection can also be produced by means of a soldering method or adhesive attachment.

Detailed information on the attachment of the process chamber 301 and the filling operation of the annular space 3 are discussed in connection with FIGS. 3b-3e.

The process chamber 301 in accordance with FIG. 3a has, as in the case of the first two embodiments, an outlet opening 303 and an inlet opening 305, which are each arranged at the side wall 306 of the process chamber 301. The process chamber 301, in turn, is connected via the outlet opening 303 to a vacuum system, which is not illustrated, with the coupling in this embodiment also occurring by means of a flange connection 33. The interior of the process chamber 301 can be evacuated by means of the outlet opening 303. The process chamber 301 is connected to the gas supply system 50 via the inlet opening 305, so that the process chamber 301 can be filled with an appropriate process gas from a gas tank 51. Further features and properties of the gas supply system 50, the vacuum system, and the connection thereof to the process chamber 301 may be taken from the discussions in connection with the first and second embodiment.

Furthermore, the process chamber 301 has a lead-through opening 304, which is arranged at the cover wall 307 of the process chamber 301. In order to connect the interior of the process chamber 301 to the annular space 3 of the receiver tube 4, the filling device 300 includes a punching system 70, by means of which a cannula 309, which is open at both ends, can be pressed through the wall 5. The punching system 70 has a punching rod 72, which extends perpendicularly through the lead-through opening 304 at least partially into the interior of the process chamber 301 and is arranged movably on an axis T. In order to be able to move the punching rod 72, it is connected to a stroke apparatus outside of the process chamber 301, which is not illustrated in FIG. 3*a*. When a force is imposed on the punching rod 72 along the axis T by the stroke apparatus, said punching rod can be pushed into the interior of the process chamber 301 and then retracted to its initial position.

In the interior of the process chamber 301, the punching rod 72 is completely surrounded by a seal 74 in the form of a bellows. This seal 74 seals the interior of the process chamber 301 against the lead-through opening 304 and extends from the cover wall 307 to the punching head 73. In this case, the punching head 73 forms the end of the punching rod 72 facing away from the cover wall 307 and arranged inside of the process chamber 301.

The cannula 309 is reversibly fastened at this punching head 73. The cannula 309 has two ends 310 and 311. The end 310 forms the connecting end 310 between the cannula 309 and the punching head 73 and the end 311 forms the puncturing end 311, with which the cannula 309 is forced through the wall 5. The connecting end 310 is flattened for a loss-free transmission of force between the cannula 309 and the punching head 73, whereas the puncturing end 311 has a point for facilitated penetration of the wall 5.

A spiral spring can be arranged within the seal 74 and, when the punching rod 72 moves, produces a restoring force that acts to bring the punching system 70 back into its initial position.

In the third embodiment of the filling device 300, in addition, two lead-through openings 313, each of them for an electrode 312, are arranged through the side wall 306. These electrodes 312 can move on an axis E that is perpendicular to the side wall 306. Furthermore, the electrodes 312 are connected to a voltage source, which is not illustrated in FIG. 3*a*. Further information on the electrodes 312 is discussed in connection with FIG. 3*e*.

In FIGS. 3*b* to 3*e*, individual steps of the filling operation of the annular space 3 of a receiver tube 4 are illustrated schematically by means of the third embodiment of the filling device 300.

Figure 3B:
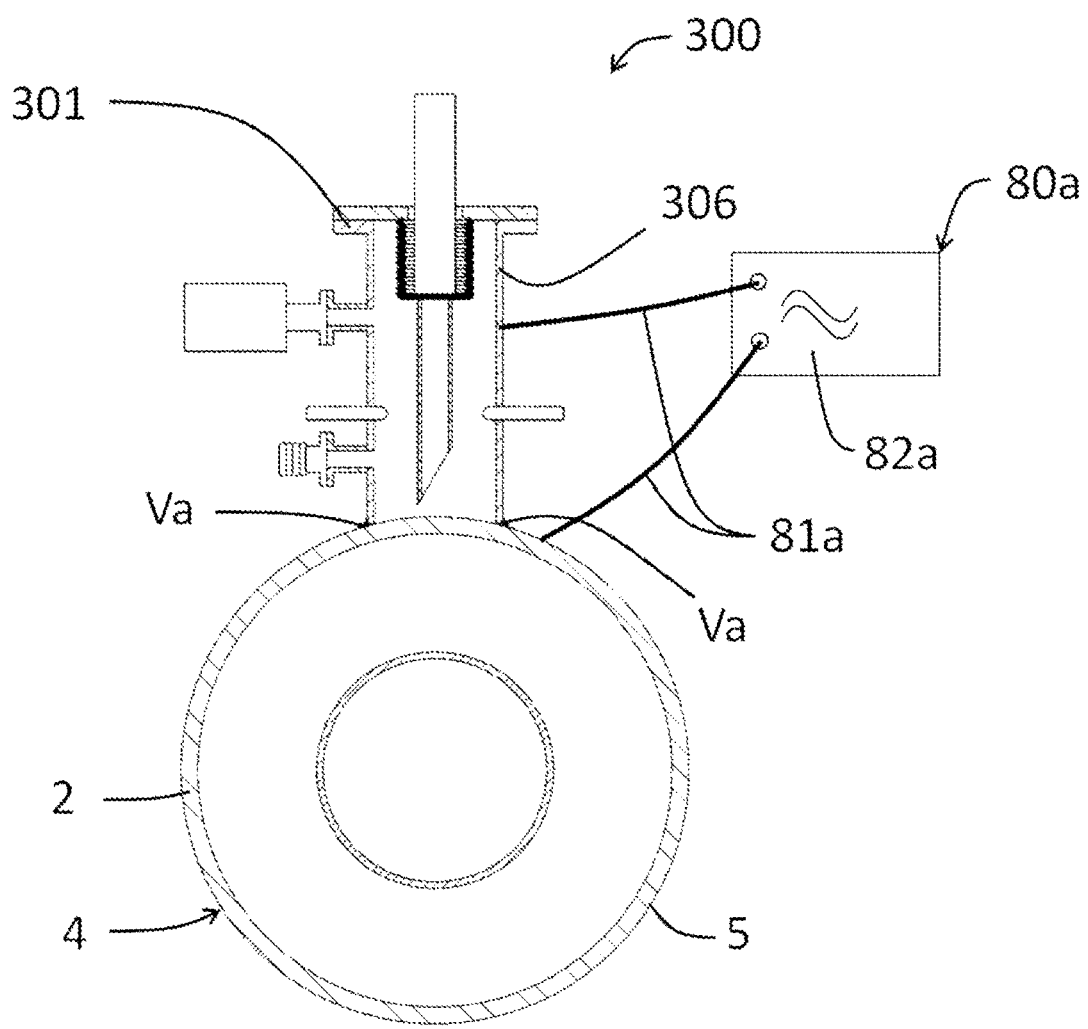

Depicted in FIG. 3*b* is the first process step of the filling operation of the annular space 3, in which the process chamber 301 is placed onto the cladding tube 2 and, in particular, onto the wall 5, so that the side wall 306 is in direct contact with the wall 5. Both the process chamber 301 and the wall 5 are composed of an electrically conductive material. Subsequently, the process chamber 301 and the wall 5 are connected to the voltage source 82*a* by means of electrical wires 81*a*. The electrical wires 81*a* and the voltage source 82*a* together constitute the electrical system 80*a*. An electrical voltage generated between the side wall 306 and the wall 5 results in an electric current flowing through the connecting sites and leading, on account of Joule current heating, to welding of the process chamber 301 with the wall 5 at the connecting sites thereof. The connection thereby produced, Va, seals the interior of the process chamber 301 toward the outside in a gastight manner. Alternatively, the connection Va can be produced in a material-bonded manner by soldering or adhesive bonding.

Figure 3C:
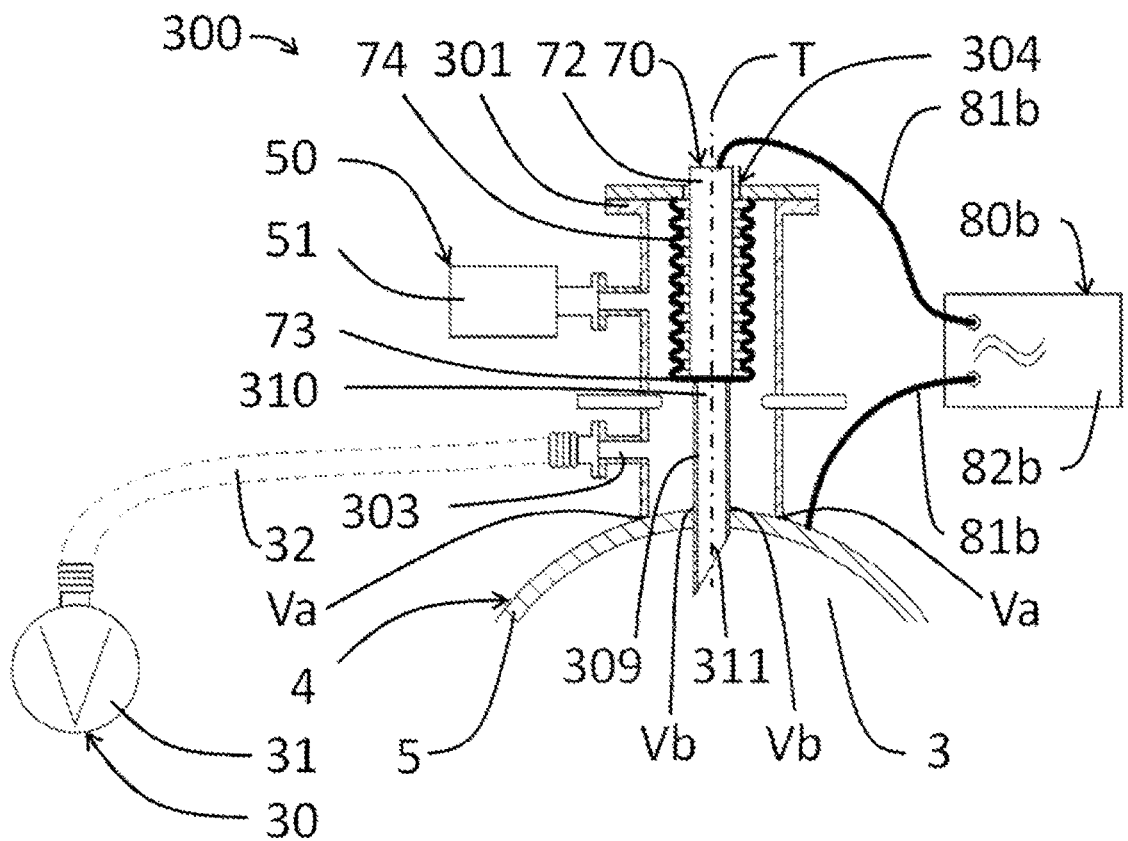

Once the connection Va has been produced, the process chamber 301 is evacuated via the outlet opening 303 by use of the vacuum pump 31 of the vacuum system 30 illustrated in FIG. 3*c*. Once the interior of the process chamber 301 drops below a maximum pressure, the process chamber 301 can be filled optionally with a process gas from the gas tank 51 of the gas supply system 50. Subsequently, the cannula 309 is pressed through the wall 5 by means of the punching system 70. For this purpose, the cannula 309 is arranged with its connecting end 310 at the punching head 73. By means of an external stroke apparatus, the punching rod 72, together with the cannula 309, is caused to travel on the axis T from the initial position in the direction of the receiver tube 4. This movement occurs preferably until the puncturing end 311 has penetrated completely into the annular space 3. In this case, the vacuum or the process gas inside of the process chamber 301 prevents contamination of the annular space 3 when the cannula 309 punctures the wall 5.

Because the seal 74 is connected to both the cover wall 307 and the punching head 73, it expands during movement in the axial direction. In the process, the inner space of the process chamber 301 remains sealed from the lead-through opening 304 during the complete movement of the punching system 70.

In order to ensure a secure sliding of the cannula 309 through the wall 5, both the cannula 309 and the wall 5 are preferably composed of metal. Metal also has the advantage of being electrically conductive and weldable, which is required for the connecting process between the cannula 309 and the wall 5 described below. The punching rod 72, too, is composed of an electrically conductive material, with the punching rod 72 and the cannula 309 being electrically connected to each other.

Once the puncturing end 311 of the cannula 309 has been pressed completely through the wall 5, an electrical voltage is also induced between the punching system 70 and the wall 5 by means of the voltage source 82*b* and the electrical wires 81*b*. On account of the electrical contact between the punching rod 72 and the cannula 309, this voltage leads to a flow of electrical current through the connecting site of the cannula 309 and the wall 5, which, in turn, on account of the Joule current heating, leads to a material-bonded welded connection Vb between the cannula 309 and the wall 5 at this connecting site. Accordingly, the cannula 309 is connected to the wall 5 in a firm and fluidtight manner.

Figure 3D:
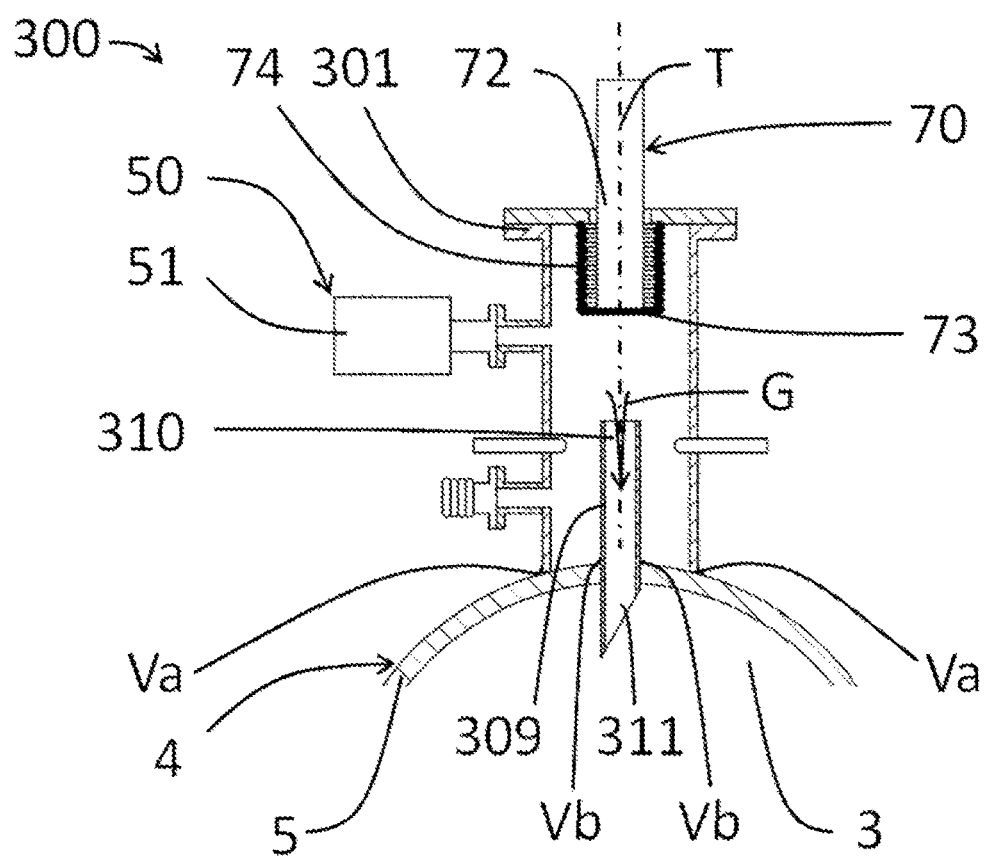

The electrical system 80*b*, composed of the electrical wires 81*b* and the voltage source 82*b*, can be identical to the electrical system 80*a*. The process steps subsequent to the connection Vb produced between the cannula 309 and the wall 5 are illustrated in FIG. 3*d*.

In order to produce a spatial connection between the interior of the process chamber 301 and the annular space 3, the punching rod 72, together with the punching head 73, is moved away from the receiver tube 4 along the axis T, so that the initial position of the punching system 70 is reassumed. However, the cannula 309 remains connected to the wall 5. As a result, the connecting end 310 of the cannula lies freely in the interior of the process chamber 301 and the puncturing end 311 lies freely in the annular space 3 of the receiver tube 4 and, in consequence thereof, the cannula 309 forms a spatial passage between the process chamber 301 and the annular space 3. Once the process gas is introduced from the gas tank 51 into the process chamber 301, the process gas flows from the process chamber 301 through the cannula 309 into the annular space 3 of the receiver tube 4 on account of the now prevailing pressure gradient from the process chamber 301 into the annular space 3. This gas flow G occurs until the intended pressure prevails in the annular space 3, an intended gas quantity flows into the annular space 3, or an intended flow time has expired.

Figure 3E:
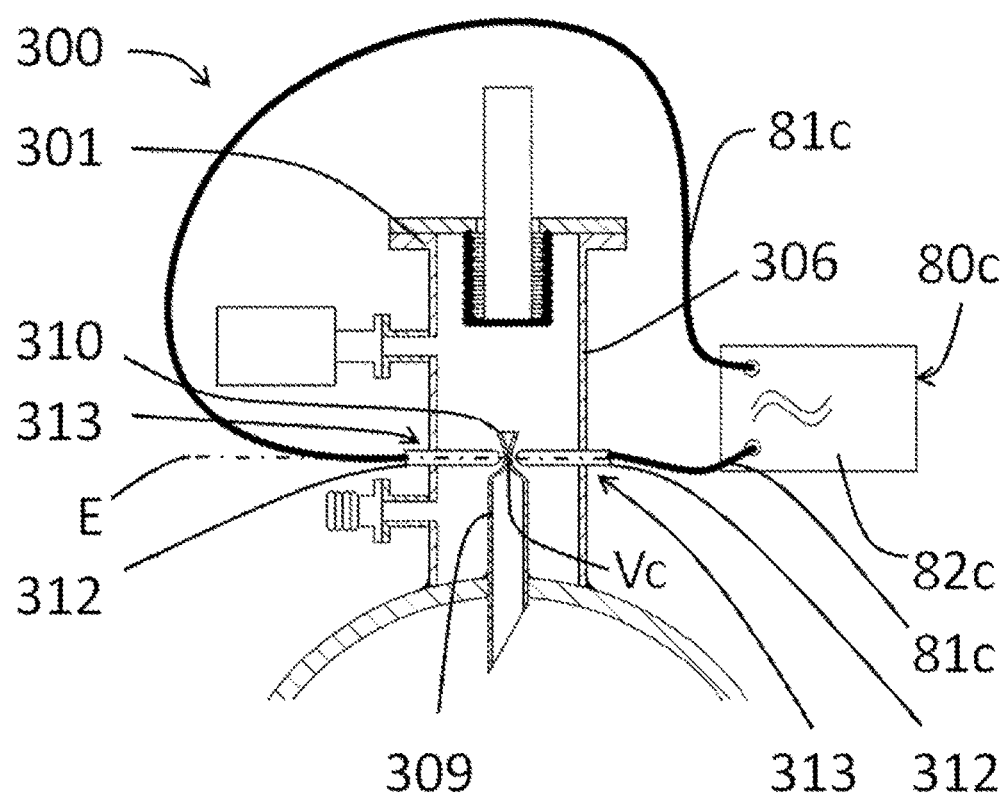

After the annular space 3 has been filled with the process gas, the cannula 309 is closed again, this being illustrated in FIG. 3e.

In order to make possible this closing, the two opposite-lying electrodes 312 in the side wall 306 of the process chamber 301 come into use. They are mounted on an axis E so that they can shift in place and extend through the lead-through openings 313 from outside into the interior of the process chamber 301. In this case, the lead-through openings 313 are preferably vacuum lead-throughs.

The electrodes 312 are connected via electrical wires 81c to an electrical voltage source 82c, by means of which an electrical voltage can be generated between the two electrodes 312. The electrical wires 81c, together with the voltage source 82c, constitute the electrical system 80c. This system 80c can be identical to the electrical systems 80b and/or 80a.

In order to close the cannula 309, the electrodes 312 are moved toward the cannula 309 on the axis E until they contact each other. The contact sites are located in this case preferably near to the connecting ends 310 of the cannula 309. Subsequently, an electrical voltage is applied at the electrodes 312. On account of the Joule current heating, this voltage leads to an increase in temperature and ultimately to a softening of the cannula 309 at the contact sites between the cannula 309 and the electrodes 312. The end 310 of the cannula 309 can thus be deformed by an imposed force. Once the cannula 309 has attained a viscosity at the contact sites to the electrodes 312 that is suitably high for deformation, the electrodes 312 are moved further toward each other on the axis E. This occurs until the opposite-lying walls of the cannula 309 touch each other. When an appropriately high pressure of the electrodes 312 on the wall of the cannula 309 exists, a material-bonded welded connection Vc is finally formed and separates the annular space 3 once again from the interior of the process chamber 301 in an airtight manner.

Accordingly, the annular space 3 of the receiver tube 4 is filled with process gas and once again closed off against external influences in an airtight manner.

Figure 4A:
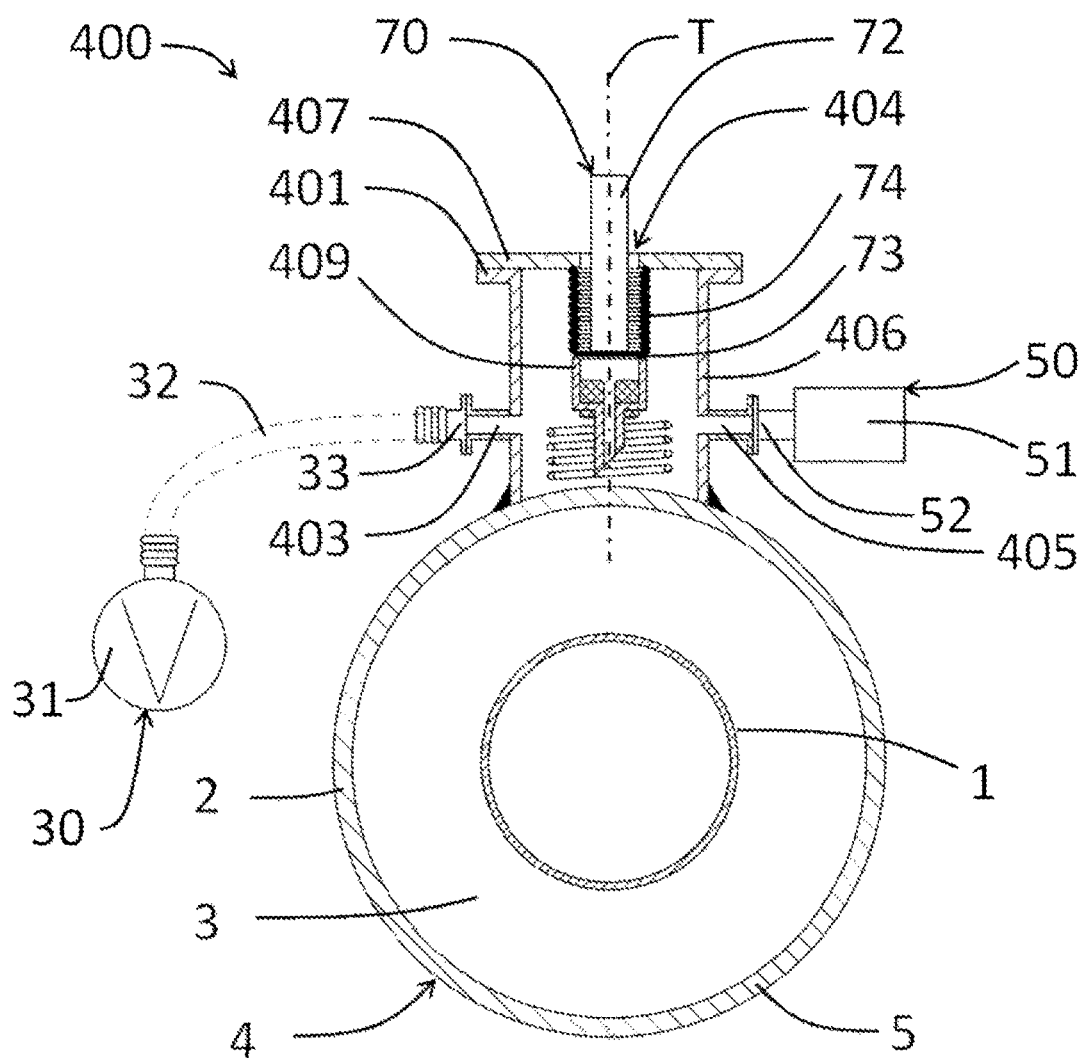

A fourth embodiment of the filling device 400 is illustrated in FIG. 4a. This device 400 also has a process chamber 401, which is arranged directly at the receiver tube 4 in an airtight manner. The arrangement in this case can occur by means of a fastening system 20, for example, as is illustrated in FIG. 1a, or by means of an irreversible connection, as is illustrated in FIG. 3a or 4a.

The process chamber 400 has, as in the case of the two embodiments 200 and 300, an outlet opening 403 and an inlet opening 405, each of which is arranged at the side wall 406 of the process chamber 401, with the openings 403 and 405 lying opposite to each other. The process chamber 401, in turn, is connected to a vacuum system 30 via the outlet opening 403, with the coupling occurring in this embodiment as well by means of a flange connection 33. The process chamber 401 is connected to the gas supply system 50 via the inlet opening 405. Accordingly, the process chamber 401 can be evacuated and filled with a process gas.

Further features and properties of the gas supply system 50, the vacuum system 30, and the connection thereof to the process chamber 401 may be taken from the discussions in connection with the second and third embodiment.

Figure 4B:
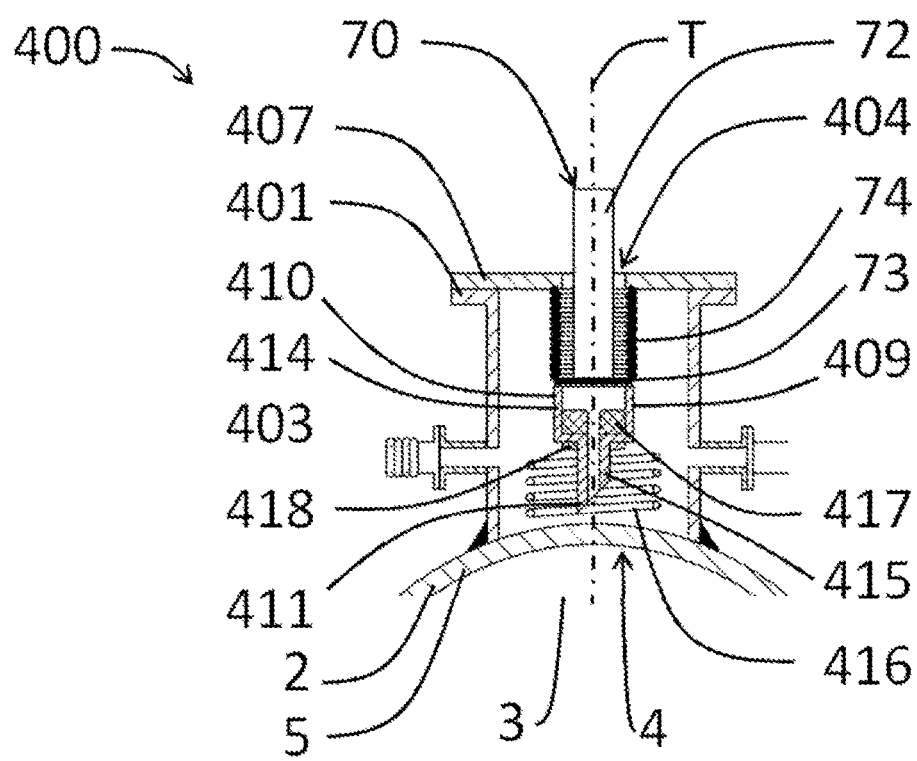

FIG. 4b depicts a cutout illustration of FIG. 4a. As can be seen from this figure, the process chamber 401 has a lead-through opening 404, which is arranged at the cover wall 407. In order to connect the interior of the process chamber 401 to the annular space 3 of the receiver tube 4, the filling device 400 contains a punching system 70, by means of which a cannula 409 that is open at both ends can be pressed through the wall 5.

The punching system 70 has the same properties and features as already discussed in connection with FIG. 3a.

However, the cannula 409 differs from the cannula 309 of the third embodiment of the filling device 300. The cannula 409 has two different portions 414 and 415. The portion 414 represents the closure portion 414 and the portion 415 represents the puncturing portion 415, with the diameter of the closure portion 414 being greater than the diameter of the puncturing portion 415. Furthermore, the closure portion 414 comprises the connecting end 410, by way of which the cannula 409 is connected to the punching head 73 of the punching system 70. Located at the bottom end of the puncturing portion 415 is the puncturing end 411 of the cannula 409, with which the wall 5 is penetrated, for example. A closure material 417 is arranged, in addition, in the cannula 409 and, in particular, in the closure portion 414. This closure material 417 is arranged in such a way that, initially, a spatial passage exists between the two ends 410 and 411 and the function of the cannula is ensured.

Furthermore, the closure material 418 is arranged outside of the cannula 409 in the connecting region between the closure portion 414 and the puncturing portion 415. The closure materials 417 and 418 can be identical or different. If both the closure material 417 and the closure material 418 are each composed of a solder, then the closure material 417 preferably has a higher melting temperature than the material 418.

In order to heat and melt the closure materials 417 and 418, the process chamber 401 has a heating apparatus 416 in the form of a spiral heating element or an induction coil, which is located in the interior of the process chamber 401. The heating apparatus 416 is arranged in such a way that the cannula 409 extends at least partially through it.

Figure 4C:
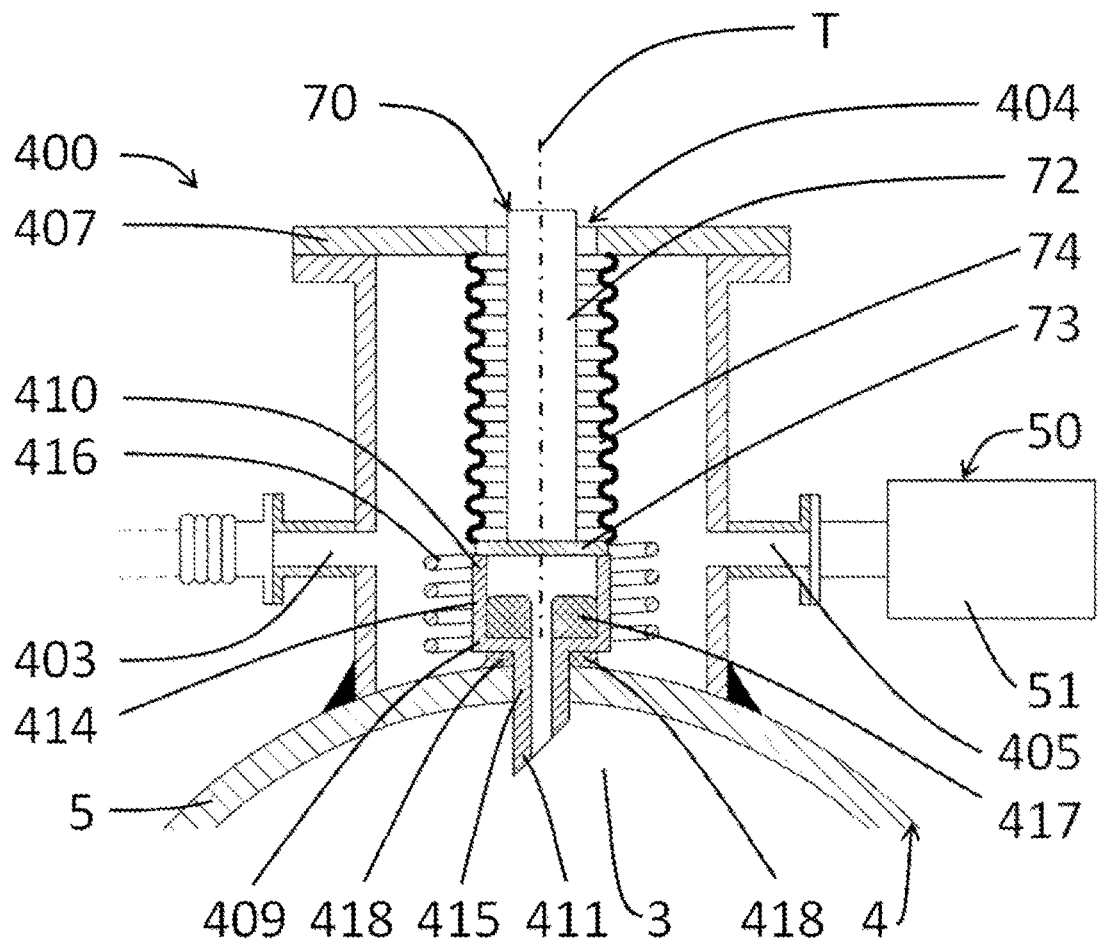

The filling process of the annular space 3 of a receiver tube 4 will be discussed in connection with FIGS. 4c to 4e.

The first process steps of putting in place the process chamber 401, connecting the process chamber 401 to the wall 5, and subsequently evacuating the process chamber 401 and filling it with a process gas correspond to the process steps that were discussed in connection with FIG. 3b.

After the process chamber 401 is placed on the wall 5 of the receiver tube 4 in a gastight manner, evacuated, and optionally already filled with the process gas, the cannula 409 is pressed through the wall 5 by means of the punching system 70. This step is illustrated in FIG. 4c. For this purpose, the cannula 409 is arranged with its connecting end 410 at the punching head 73. By means of an external stroke apparatus, which is not illustrated in FIG. 4c, the punching rod 72, together with the cannula 409, is caused to travel on the axis T from the initial position in the direction of the receiver tube 4. This movement occurs until the puncturing end 411 has penetrated preferably completely into the annular space 3 and the closure material 418 is in direct connection between the closure portion 414 of the cannula 409 and the wall 5. In the process, the cannula 409 punctures the wall 5 only with its puncturing portion 415. The closure portion 414 remains completely inside of the process chamber 401.

Preferably, the closure material 418 is formed by a thermally resistant adhesive. The closure material 418 can alternatively be formed from a solder, which, after the cannula 409 has punctured the wall 5 is fused by means of the heating apparatus 416. After subsequent solidification, it fixes the cannula 409 in place at the wall 5 and seals off the connecting site.

The vacuum or process gas inside of the process chamber 401 prevents contamination of the annular space 3 when the cannula 409 punctures the wall 5.

Because the seal 74 is connected to both the cover wall 407 and the punching head 73, it expands during the movement. The inner space of the process chamber 401 is therefore sealed off from the lead-through opening 404 during the complete movement of the punching system 70.

Figure 4D:
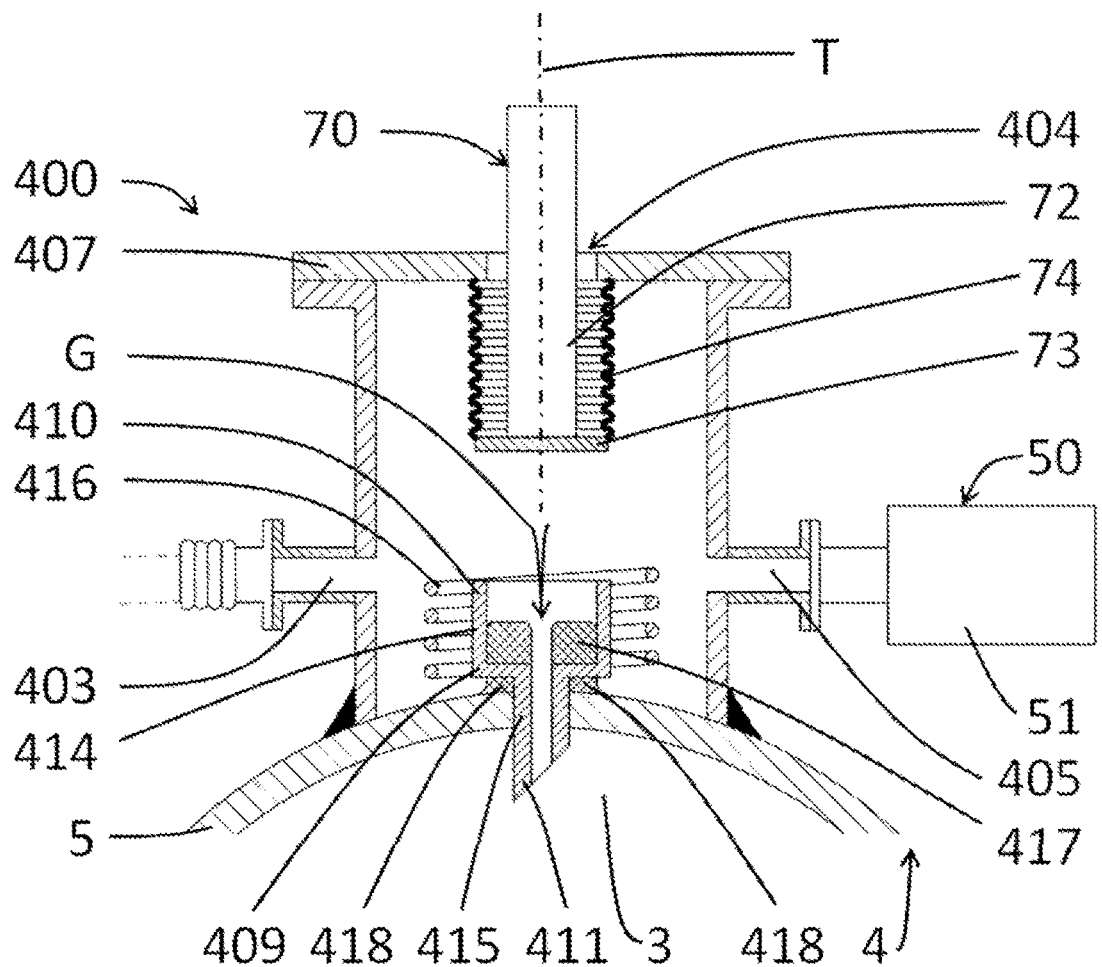

The process steps that occur subsequent to puncture of the wall 5 by means of the cannula 409 are illustrated in FIG. 4d.

In order to produce a spatial connection between the interior of the process chamber 401 and the annular space 3, the punching rod 72, together with the punching head 73, is moved away from the receiver tube 4 along the axis T, so that the initial position of the punching system 70 is assumed once again. However, the cannula 409 continues to be connected to the wall 5 in a material-bonded manner. As a result, the connecting end 410 of the cannula 409 lies freely in the interior of the process chamber 401 and the puncturing end 411 lies freely in the annular space 3 of the receiver tube 4. The cannula 409 forms a spatial passage between the process chamber 401 and the annular space 3. The process gas flows from the gas tank 51 into the process chamber 401 on account of the prevailing pressure gradient in this direction. This gas flow G occurs until the intended pressure prevails in the annular space 3, an intended gas quantity flows into the annular space 3, or an intended flow time has expired.

Figure 4E:
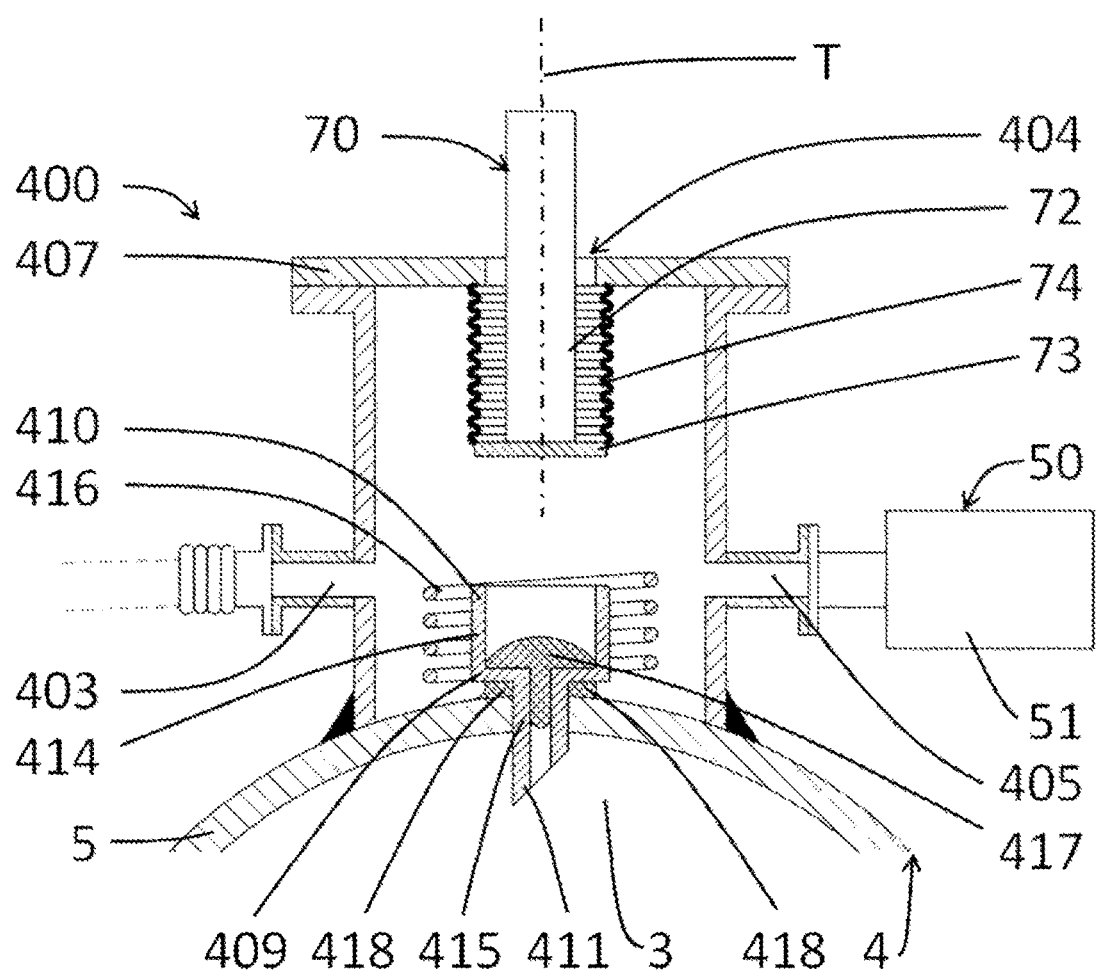

After the annular space 3 has been filled with process gas, the cannula 409 is closed again, this being illustrated in FIG. 4e.

For this purpose, the closure material 417 arranged inside of the closure portion 414 is also composed preferably of a solder, which is fused by means of the heating apparatus 416. Once the closure material 417 has been fused by the heating apparatus 416, it flows at least partially into the puncturing portion 415 and closes the cannula 409.

If both the closure material 417 and the closure material 418 are each composed of a solder, then either it needs to be ensured that the closure material 417 does not run into the closure portion 414 already during fusion for the purpose of fixing the cannula in place at the wall 5. For this reason, it preferably has a higher melting temperature than the closure material 418. Otherwise, when the two closure materials are identical, both materials are fused one time only after filling, as a result of which both the connecting site between the cannula and the wall and the lead-through opening in the cannula are sealed in one process step.

After subsequent solidification of the closure materials, the annular space 3 and the process chamber 409 exist again spatially separated from each other and the filling process of the annular space 3 with a process gas is terminated.

Figure 5A:
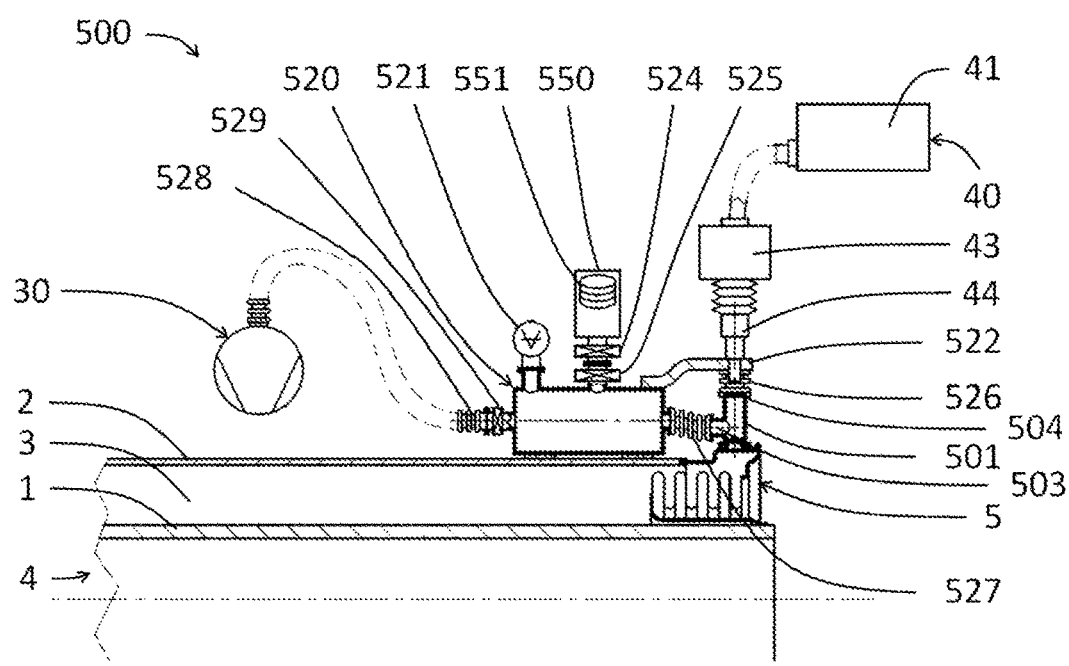
Figure 5B:
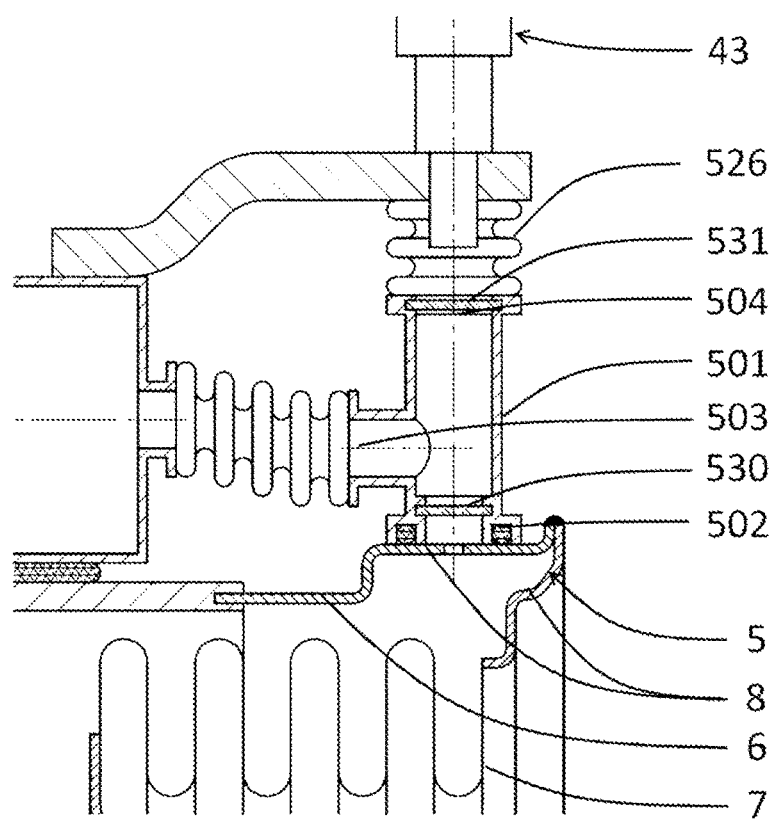

A fifth embodiment of the filling device 500 is illustrated in lengthwise section through the receiver tube in FIG. 5a. FIG. 5b shows an enlarged cutout. The wall 5 has a glass-metal transition element 6 known from prior art, an expansion compensation device 7, and further connecting elements 8.

The filling apparatus 500 has a process chamber 501, which is arranged directly on the wall 5 in a gastight manner. Furthermore, the filling device 500 has a support system 520, which is arranged at the cladding tube 2 in a manner that, for example, is vibration dampened. This support system 520 is connected to the process chamber 501 by means of two corrugated hoses 526 and 527 and serves for decoupling any mechanical load due, for example, to a vacuum system 30 or a laser system 40 from the process chamber 501.

The support system 520 has two valves 525 and 529. It is possible by means of these valves 525 and 529 to connect the support system 520, on the one hand, to a vacuum system 30 for evacuating the support system 520 and the process chamber 501 and, on the other hand, to a gas supply system 550 for filling the support system 520 and the process chamber 501 with a process gas and to disconnect them at will.

A getter 551 is placed in the gas supply system 550. Zirconium-based getters 551 absorb air or hydrogen, but not the process gas xenon that is preferably used. Accordingly, the getter 551 serves to keep the support system 520 and the process chamber 501 free of air from the surrounding or hydrogen from the annular space 3 of the receiver tube 4 when the vacuum system 30 has been separated by closing of the valve 529.

Furthermore, the support system 520 has a sensor 521, by means of which state data of the support system 520 and thus of the process chamber 501 can be determined. Thus, for example, the existing pressure, the gas composition, the temperature, and other characteristic parameters of the support system 520 can be determined.

The support system 520 further has a support arm 522, at which the laser system 40 and, in particular, the laser head 43 are arranged. By means of the corrugated hose 526, the process chamber 501 is connected to the support arm 522 and thus also to the laser head 43. In this case, the support arm 522 and the laser head 43 are arranged in such a way that the laser beam emerging from the laser head 43 passes along the central axis in the lengthwise direction through the process chamber 501 and impinges perpendicularly on the wall 5.

It can further be seen in FIG. 5b that, in the process chamber 501 at the side that faces the wall 5, a protective glass 530 and, at the side that faces the laser head 43, a window 531 are arranged. Both the window 531 and the protective glass 530 are optically transparent to the laser beam. In addition, the window 531 is installed in a gastight manner in the process chamber 501, so that only the laser beam and no other foreign matter, such as, for example, dust or gases, can enter the process chamber 501.

By contrast, the protective glass 530 is arranged in the process chamber 501 in such a way that, during laser beam drilling, metal that has vaporized out of the drilled hole, can be trapped, but a subsequent evacuation of the annular space 3 continues to be possible. Consequently, the protective glass 530 is arranged reversibly in the process chamber 501 and/or is designed to be permeable to gas.

Figure 6A:
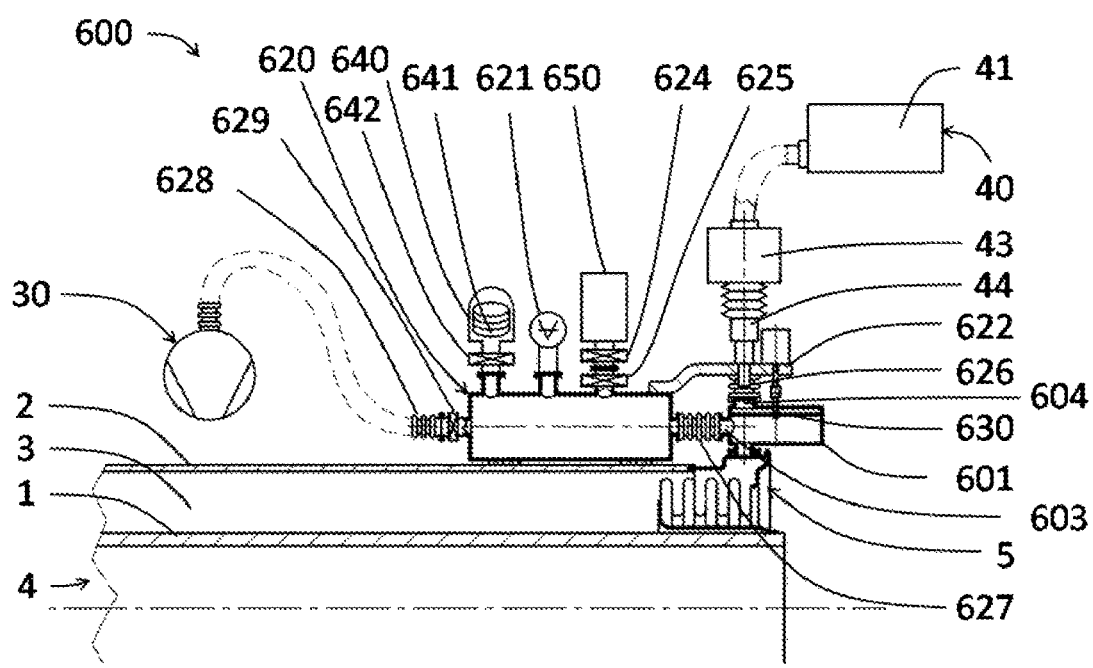

Illustrated in FIG. 6a is a sixth embodiment of the filling device 600. This filling device 600 is identical to the filling device 500 apart from two differences. As first difference, the getter 641 is arranged in a sight glass 640. This sight glass 640 is connected to the support system 620 and makes possible a gas exchange between the sight glass 641 and the support system 620. For example, the getter 641 is formed by a vaporization getter. Such a vaporization getter is formed by a precipitate of barium on the inner side of the sight glass 640. The barium precipitate serves, on the one hand, to absorb undesired gases and, on the other hand, however, it also alters its metallic luster appearance when it has absorbed a greater quantity of gases. It is thus possible with the vaporization getter 641 in the sight glass 640 to determine whether, during the filling operation, unallowable high quantities of air or other reactive gases have penetrated into the process chamber 601 or the support system 620.

Figure 6B:
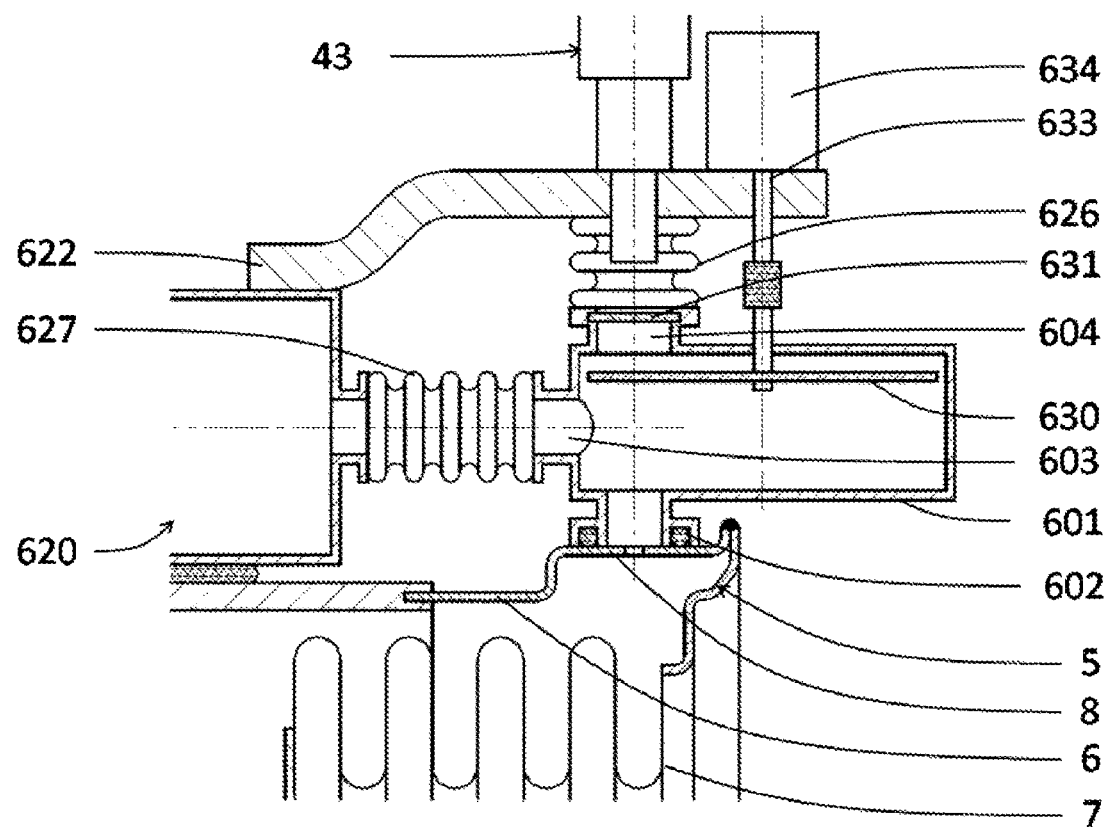

As second difference to the filling device 500, the protective glass 630 can rotate and is arranged inside of the process chamber 601. This is discussed in greater detail below on the basis of the enlarged cutout in FIG. 6b.

The process chamber 601, in analogy to the process chamber 501, is connected to the support system 620 by means of two corrugated hoses 626 and 627. The process chamber 601, in analogy to the process chamber 501 also has a window 631 with the same properties as the window 531. The difference with respect to the process chamber 501 consists, however, as already mentioned, in its ability to rotate and in the arrangement of the protective glass 630 inside of the process chamber 601. The protective glass 630 is connected via a rotary shaft 633 to a motor 634, which can rotate the protective glass 630 around the lengthwise axis of the rotary shaft 633. In this case, the motor 634 is preferably arranged on the support arm 622. Alternatively, instead of the motor 634, it is also possible to provide a handle so that the protective glass 630 can be rotated manually around the lengthwise axis of the rotary shaft 633.

The rotatable protective glass 630 is also optically transparent to the laser beam and serves to trap metal that has vaporized from the drilled hole during laser drilling and to keep it away from the window 631. After the drilled hole has been produced, the protective glass 630 can be rotated further, so that the laser beam again can pass through a glass area that has not been subjected to vapor deposition. Alternatively, the protective glass 630 can also be segmented or perforated, so that, after it has rotated, the laser beam impinges on a free zone, that is, no longer passes through the material of the protective glass.

Alternatively to a rotational movement, a sliding movement can also occur in order to bring a window portion that has not been subjected to vapor deposition or is free into the path of the laser beam. In addition, the protective glass 630 can alternatively be pivoted (swung out) around from the beam path around an axis that is directed perpendicular to the plane of the drawing.

In order to evacuate the annular space 3 in the fifth and sixth embodiment and to fill it with a process gas, the following method steps are carried out. The description of the method refers, by way of example, to the sixth embodiment.

First of all, the process chamber 601 is connected to the support system 620 by means of the corrugated hoses 626 and 627. Subsequently, the gas supply system 650 and the sensor 621 are also connected to the support system 620. After this, the process chamber 601 is fastened at the wall 5 and the support system 620 is fastened at the cladding tube 2 of the receiver tube 4. After the vacuum system 30 as well has been attached to the support system 620, both the support system 620 and the process chamber 601 are evacuated. This occurs until a pressure of less than $10^{-3}$ mbar is registered by the sensor 621.

Subsequently, the getter 640 is connected to the inner space of the support system 620, by opening a valve 642 between the sight glass 641 and the support system 620. After this, the valve 629 is shut, as a result of which the vacuum system 30 exists separated from the support system 620. In order to produce the opening through the wall 5, the laser head 43 is fastened to the support arm 622. At the start of the laser drilling through the wall 5, the getter 640 must have a metallic luster, which reveals that no contamination of the process chamber 601 or of the support system 620 has occurred during the preceding process steps. Subsequently, the actual drilling of the hole O1 through the wall 5 occurs by means of the laser beam.

For filling of the annular space 3 with the process gas, the values 624 and 625 are opened, so that the process gas, such as, for example, xenon, flows from the gas supply system 650 into the annular space 3 until pressure compensation is reached at approximately 10 mbar. The pressure is measured, for example, by means of the sensor 621. For further monitoring that, during the filling operation, no entry of air into the support system 620 or the process chamber 601 has taken place, the getter 640 can continue to be inspected for visible changes. For subsequent closing of the opening in the wall 5, the focal point diameter of the laser beam is widened by means of the optical system 44 and the opening in the wall 5 is again irradiated. For monitoring whether the opening has also been successfully closed, visual inspection occurs on the one hand and a lowering of the hydrogen partial pressure can be registered by means of the sensor 621 on the other hand. For a third monitoring possibility, the valve 629 can be opened once again, as a result of which, on account of the vacuum system 30, a rapid drop in pressure occurs and a final pressure of approximately $10^{-3}$ mbar ought to be achieved. If this final pressure is not achieved or is achieved only very slowly, possibly gas could flow back from the annular space 3 into the process chamber 601, which would point to a leaking closure of the opening. If the annular space 3 has been filled with the process gas successfully, then the process chamber 601 and the support system 620 are ventilated and all components of the filling device 600 are dismantled form the receiver tube 4.

| LIST OF REFERENCE SIGNS | |
|---|---|
| 1 | absorber tube |
| 2 | cladding tube |
| 3 | annular space |
| 4 | receiver tube |
| 5 | wall |
| 6 | glass-metal transition element |
| 7 | expansion compensation device |
| 8 | connecting element |
| 20 | fastening system |
| 21 | clamp |
| 22 | fastener |
| 30 | vacuum system |
| 31 | vacuum pump |
| 32 | vacuum hoses |
| 33 | flange connection |
| 40 | laser system |
| 41 | laser source |
| 42 | light guide |
| 43 | laser head |
| 44 | optical system |
| 45 | focusing unit |
| 46 | flange connection |
| 50 | gas supply system |
| 51 | gas tank |
| 52 | flange connection |
| 70 | punching system |
| 72 | punching rod |
| 73 | punching head |
| 74 | seal |

LIST OF REFERENCE SIGNS

| | |
|---|---|
| 80a, b, c | electrical system |
| 81a, b, c | electrical wires |
| 82a, b, c | voltage source |
| 100 | first embodiment of the filling device |
| 101 | process chamber |
| 102 | seal |
| 103 | outlet opening |
| 104 | lead-through opening |
| 105 | inlet opening |
| 106 | side wall |
| 107 | cover wall |
| 200 | second embodiment of the filling device |
| 201 | process chamber |
| 202 | seal |
| 203 | outlet opening |
| 204 | lead-through opening |
| 205 | inlet opening |
| 206 | side wall |
| 207 | cover wall |
| 208 | lead-through opening |
| 209 | closure material |
| 300 | third embodiment of the filling device |
| 301 | process chamber |
| 303 | outlet opening |
| 304 | lead-through opening |
| 305 | inlet opening |
| 306 | side wall |
| 307 | cover wall |
| 309 | cannula |
| 310 | connecting end of the cannula |
| 311 | puncturing end of the cannula |
| 312 | electrode |
| 313 | lead-through opening |
| 400 | fourth embodiment of the filling device |
| 401 | process chamber |
| 403 | outlet opening |
| 404 | lead-through opening |
| 405 | inlet opening |
| 406 | side wall |
| 407 | cover wall |
| 409 | cannula |
| 410 | connecting end of the cannula |
| 411 | puncturing end of the cannula |
| 414 | closure portion |
| 415 | puncturing portion |
| 416 | heating apparatus |
| 417 | closure material |
| 418 | closure material |
| 500 | fifth embodiment of the filling device |
| 501 | process chamber |
| 502 | seal |
| 503 | inlet/outlet opening |
| 504 | lead-through opening |
| 520 | support system |
| 521 | sensor |
| 522 | support arm |
| 524 | valve |
| 525 | valve |
| 526 | corrugated hose |
| 527 | corrugated hose |
| 528 | corrugated hose |
| 529 | valve |
| 530 | protective gas |
| 531 | window |
| 550 | gas supply system |
| 551 | getter |
| 600 | sixth embodiment of the filling device |
| 601 | process chamber |
| 602 | seal |
| 603 | inlet/outlet opening |
| 604 | lead-through opening |
| 620 | support system |
| 621 | sensor |
| 622 | support arm |
| 624 | valve |
| 625 | valve |
| 626 | corrugated hose |
| 627 | corrugated hose |
| 628 | corrugated hose |
| 629 | valve |
| 630 | protective gas |
| 631 | window |
| 633 | rotary shaft |
| 634 | motor |
| 640 | sight glass |
| 641 | getter |
| 642 | valve |
| 650 | gas supply system |
| O1 | opening of the first embodiment |
| O2 | opening of the second embodiment |
| D | axis of the closure material |
| E | axis of the electrode |
| G | gas flow |
| L1 | axis of the laser beam of the first embodiment |
| L2 | axis of the laser beam of the second embodiment |
| S | intersection point of the axes D and L2 |
| T | axis of the punching rod |
| Va | material-bonded connection |
| Vb | material-bonded connection |
| Vc | material-bonded connection |

What is claimed is:

1. A method for introducing a protective gas into a receiver tube, comprising:
    forming an opening penetrating either a cladding tube or a wall into an annular space, wherein the annular space is between the cladding tube and an inner absorber tube of the receiver tube, wherein the wall connects the cladding tube to the inner absorber tube, and wherein the forming step is conducted under a pressure gradient from outside to inside the annular space;
    introducing the protective gas through the opening into the annular space; and
    subsequently closing the opening.

2. The method according to claim 1, wherein the receiver tube is a solar collector.

3. The method according to claim 1, wherein the forming step comprises laser drilling the opening through the cladding tube or the wall.

4. The method according to claim 3, wherein the closing step comprises laser welding the opening in the cladding tube or the wall.

5. The method according to claim 4, wherein the laser drilling comprises using a first laser beam diameter and the laser welding comprises using a second laser beam diameter, the second laser beam diameter being larger than the first laser beam diameter.

6. The method according to claim 4, wherein the laser welding further comprises laser welding with a closure material.

7. The method according to claim 6, further comprising introducing the closure material into or onto the opening after filling the annular space so that the opening is at least partially closed prior to the laser welding step.

8. The method according to claim 7, wherein the laser welding further comprises fusing an additional material to the cladding tube or the wall to close the opening.

9. The method according to claim 1, wherein the closing step comprises:
    pushing a closure material at least partially into or onto the opening; and contacting at least one electrode with the closure material and with cladding tube or the wall so that the opening is closed by resistance welding.

10. The method according to claim 1, wherein the forming step comprises mechanically forming the opening.

11. The method according to claim 10, wherein the mechanical forming step comprises pressing a cannula through the wall.

12. The method according to claim 11, wherein the introducing step comprises filling the annular space through the cannula and wherein the closing step comprises using the cannula as a closure material to close the opening.

13. The method according to claim 12, further comprising fusing the closure material to the wall to close the opening.

14. The method according to claim 13, wherein the fusing is a process selected from the group consisting of resistance welding, friction welding, and induction soldering.

15. The method according to claim 1, further comprising, before the forming step:
enclosing at least the portion of the receiver tube in which the opening is to be introduced into a process chamber;
evacuating the process chamber; and
filling the process chamber with the protective gas.

16. The method according to claim 15, wherein the introducing step comprises allowing the protective gas to exchange from the process chamber to the annular space.

17. The method according to claim 16, wherein, after the introducing and closing steps, the method further comprises ventilating the process chamber.

18. A method for introducing a protective gas into a receiver tube, comprising:
enclosing at least the portion of the receiver tube in which an opening is to be introduced into a process chamber;
forming an opening penetrating either a cladding tube or a wall into an annular space, wherein the annular space is between the cladding tube and an inner absorber tube of the receiver tube, wherein the wall connects the cladding tube to the inner absorber tube, wherein the forming step is conducted under a pressure gradient from outside to inside into the annular space, and wherein the protective gas passes from the process chamber through the opening into the annular space; and
subsequently closing the opening.

* * * * *